(12) United States Patent
Koseki et al.

(10) Patent No.: US 10,421,482 B2
(45) Date of Patent: Sep. 24, 2019

(54) ELECTRONIC CONTROL UNIT AND CONTROL METHOD FOR THE SAME

(71) Applicant: HITACHI AUTOMOTIVE SYSTEMS, LTD., Hitachinaka-shi, Ibaraki (JP)

(72) Inventors: Tomonobu Koseki, Isesaki (JP); Tomishige Yatsugi, Isesaki (JP); Fumiya Iijima, Isesaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 2 days.

(21) Appl. No.: 15/759,759

(22) PCT Filed: Aug. 8, 2016

(86) PCT No.: PCT/JP2016/073270
§ 371 (c)(1),
(2) Date: Mar. 13, 2018

(87) PCT Pub. No.: WO2017/047279
PCT Pub. Date: Mar. 23, 2017

(65) Prior Publication Data
US 2018/0178830 A1   Jun. 28, 2018

(30) Foreign Application Priority Data

Sep. 18, 2015   (JP) .................................. 2015-185038

(51) Int. Cl.
*H02P 27/06*  (2006.01)
*B62D 5/04*   (2006.01)
(Continued)

(52) U.S. Cl.
CPC ........... *B62D 5/046* (2013.01); *B62D 5/0403* (2013.01); *B62D 5/0406* (2013.01);
(Continued)

(58) Field of Classification Search
CPC ........ H02P 27/06; H02P 29/032; H02P 25/22; H02P 29/0241; B60L 50/64; B60L 50/61;
(Continued)

(56) References Cited

U.S. PATENT DOCUMENTS 4,518,268 A  *  5/1985  Swis ...................... F02B 77/083
                                                            374/144
5,970,018 A    10/1999  Iwata et al.
(Continued)

FOREIGN PATENT DOCUMENTS

JP      H10-208473 A      8/1998
JP      2014-045578 A     3/2014
(Continued)

*Primary Examiner* — Rina I Duda
(74) *Attorney, Agent, or Firm* — Foley & Lardner LLP

(57) ABSTRACT

An electronic control unit includes: inverter circuits of first and second systems driving a multiphase motor with coil sets on a coil set basis; first and second phase potential detecting circuits detecting potentials of at least one phase of current supply paths from the inverter circuits to the coil set; and a diagnosis apparatus detecting a failure based on potentials detected by the first and second phase potential detecting circuits. Under condition that the inverter circuit of the first system turns ON the upper or lower arm switching element corresponding to one phase of the first coil set and turns OFF the other one so that the inverter circuit of the second system has a high-impedance output, when the potential detected by the second phase potential detecting circuit corresponds to an output potential of the inverter circuit of the first system, the diagnosis apparatus determines that a short-circuit failure occurs.

20 Claims, 13 Drawing Sheets

(51) Int. Cl.
*H02P 29/032* (2016.01)
*H02H 3/16* (2006.01)
*H02H 7/122* (2006.01)
*H02P 25/22* (2006.01)
*H02P 29/024* (2016.01)

(52) U.S. Cl.
CPC ......... *B62D 5/0484* (2013.01); *B62D 5/0487* (2013.01); *H02H 3/162* (2013.01); *H02H 7/1222* (2013.01); *H02H 7/1227* (2013.01); *H02P 25/22* (2013.01); *H02P 27/06* (2013.01); *H02P 29/0241* (2016.02); *H02P 29/032* (2016.02)

(58) Field of Classification Search
CPC ... B60L 50/16; B60L 50/18; G01R 19/16542; G01R 31/3835; G01R 31/005
USPC .............................................. 318/49, 51, 112
See application file for complete search history.

(56) References Cited

U.S. PATENT DOCUMENTS

| | | | | |
|---|---|---|---|---|
| 7,003,412 | B2* | 2/2006 | Jensen | G01R 19/155 |
| | | | | 324/110 |
| 2007/0120530 | A1* | 5/2007 | Nozaki | B60L 3/0046 |
| | | | | 320/130 |
| 2010/0244558 | A1* | 9/2010 | Mitsutani | B60L 50/64 |
| | | | | 307/9.1 |
| 2011/0249368 | A1 | 10/2011 | Andersen | |
| 2011/0264326 | A1* | 10/2011 | Iwasaki | B62D 5/046 |
| | | | | 701/41 |
| 2014/0055887 | A1 | 2/2014 | Uryu et al. | |
| 2014/0078630 | A1* | 3/2014 | Koch | B60W 50/02 |
| | | | | 361/86 |
| 2014/0253006 | A1 | 9/2014 | Satou et al. | |

FOREIGN PATENT DOCUMENTS

| | | |
|---|---|---|
| JP | 2014-176229 A | 9/2014 |
| JP | 5614661 B2 | 10/2014 |
| WO | WO-2015/136918 A1 | 9/2015 |

\* cited by examiner

ELECTRONIC CONTROL UNIT AND CONTROL METHOD FOR THE SAME

TECHNICAL FIELD

The present invention relates to an electronic control unit for driving a multiphase motor including plural coil sets, and a control method for the same. The control unit and method are used, for example, for an electric power steering (EPS) system or for steer-by-wire motor control.

BACKGROUND ART

Patent Document 1 discloses a rotating electric machine controller for controlling a motor with two coil sets and an electric power steering device using the same. In the disclosure of Patent Document 1, high-potential switching element(s) of one or more phases in either one of two systems are controlled to be ON, and low-potential switching element(s) of one or more phases in the other system are controlled to be OFF, before the startup of the motor. Under such conditions, the presence/absence of a short-circuit between the systems is determined based on whether a phase current or two phase currents are increased.

REFERENCE DOCUMENT LIST

Patent Document

Patent Document 1: Japanese Patent No. 5614661

SUMMARY OF THE INVENTION

Problem to be Solved by the Invention

The above detection method is to supply a current through a short-circuited portion so as to detect a short circuit between motor coil sets and inverter circuits by supplying a current through a short-circuited portion. Thus, in an electric power steering device, for example, abnormal current supply will actuate an assist motor, causing an unexpected steering operation, or a large current that flows not through a coil of the motor will damage the circuit or cause burnout of wiring.

The present invention has been made in view of the above circumstances and accordingly, an object of the present invention is to provide an electronic control unit and a control method for the same, which can detect a short-circuit failure without abnormal power supply to a coil or drive circuit.

Means for Solving the Problem

The present invention provides an electronic control unit comprising:
an inverter circuit of a first system and an inverter circuit of a second system, each of which includes an upper arm switching element and a lower arm switching element for each coil of a multiphase motor having first and second coil sets; a first phase potential detecting circuit configured to detect a potential of at least one phase of a current supply path from the inverter circuit of the first system to the first coil set; a second phase potential detecting circuit configured to detect a potential of at least one phase of a current supply path from the inverter circuit of the second system to the second coil set; and a diagnosis apparatus configured to detect a failure based on potentials in each phase detected by the first and second phase potential detecting circuits, in which under condition that one of the upper arm switching element and the lower arm switching element corresponding to one phase of the first coil set is controlled to be ON and the other is controlled to be OFF by use of the inverter circuit of the first system so that the inverter circuit of the second system has a high-impedance output in all phases, when the potential of the current supply path detected by the second phase potential detecting circuit corresponds to an output potential of the inverter circuit of the first system, the diagnosis apparatus determines that a failure due to a short-circuit has occurred.

Also, the present invention provides a control method for an electronic control unit that includes: an inverter circuit of a first system and an inverter circuit of a second system, each of which include an upper arm switching element and a lower arm switching element for each coil of a multiphase motor having first and second coil sets; a first phase potential detecting circuit configured to detect a potential of at least one phase of a current supply path from the inverter circuit of the first system to the first coil set; a second phase potential detecting circuit configured to detect a potential of at least one phase of a current supply path from the inverter circuit of the second system to the second coil set; and a diagnosis apparatus configured to detect a failure based on potentials in each phase detected by the first and second phase potential detecting circuits, the control method comprising the steps of: controlling one of the upper arm switching element and the lower arm switching element corresponding to one phase of the first coil set to be ON and the other to be OFF by use of the inverter circuit of the first system, and controlling outputs in all phases of the inverter circuit of the second system to be a high impedance; detecting a potential of at least one phase by use of the second phase potential detecting circuit; and determining that a failure due to a short-circuit has occurred when the potential of the current supply path detected by the second phase potential detecting circuit corresponds to an output potential of the inverter circuit of the first system by use of the diagnosis apparatus.

Effects of the Invention

According to the present invention, the presence/absence of a short-circuit failure is determined based on whether a phase potential on the inverter circuit side of the first system is transmitted under the condition that an output of the inverter circuit of the second system is controlled to have a high impedance. Even if a short-circuit failure has occurred between the coil sets or the inverter circuits, a current path through which a current is supplied from the power supply to the ground point is not generated and no large current flows. Accordingly, a short-circuit failure can be detected without abnormal current supply to any coil or drive circuit.

MODE FOR CARRYING OUT THE INVENTION

Figure 1:
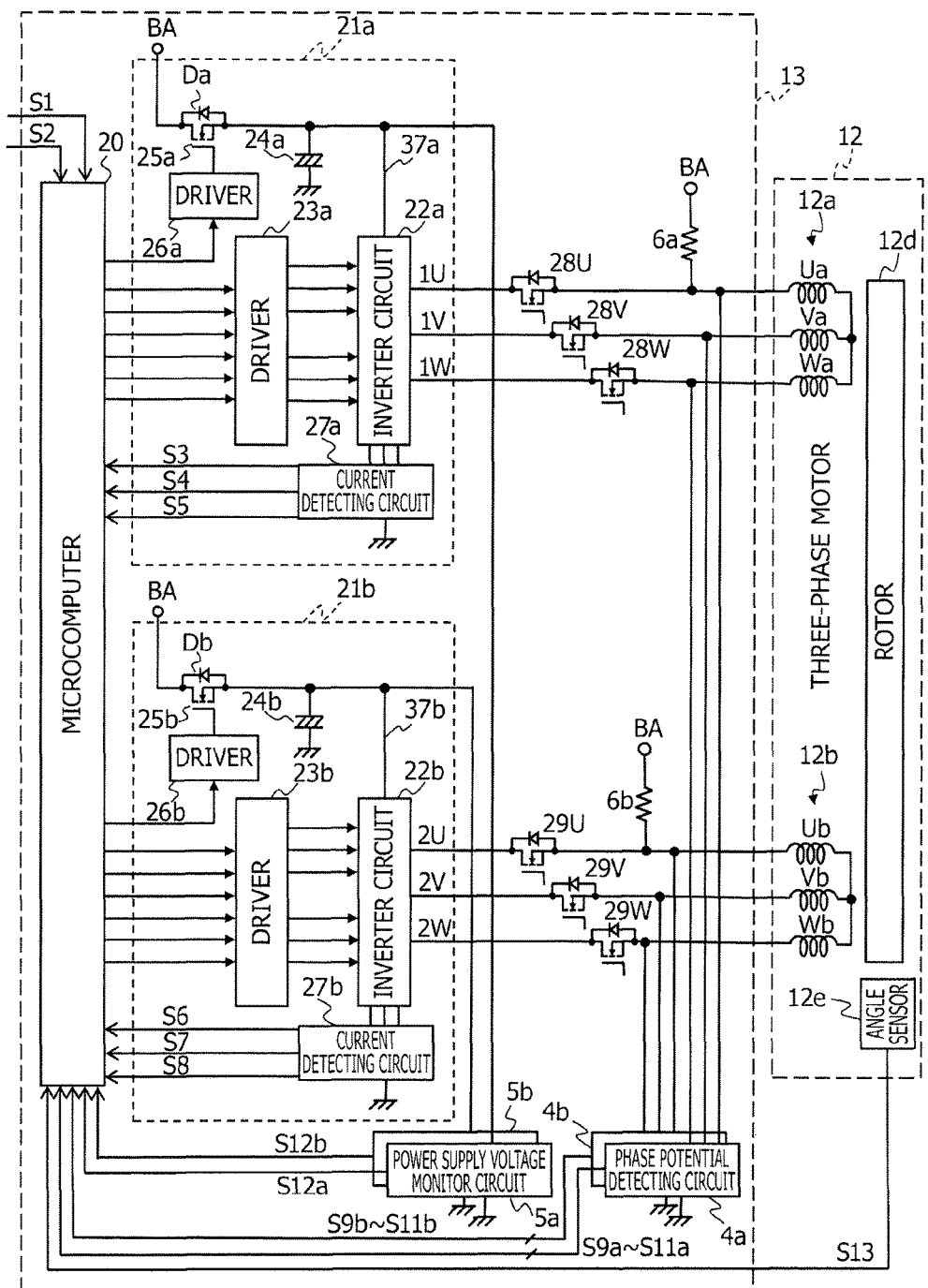
FIG. 1 is a circuit diagram illustrating a configuration example of an electronic control unit according to a first embodiment of the present invention.

Embodiments of the present invention are described below with reference to the accompanying drawings.

First Embodiment

FIGS. 1 to 5 illustrate a configuration example of an electronic control unit according to a first embodiment of the present invention. FIG. 6 is a schematic diagram of an EPS system to which this electronic control unit is applied. A brief description is first given of the EPS system. Next, described is an electronic control unit for controlling a multiphase motor that assists steering force in the EPS system.

As illustrated in FIG. 6, the EPS system is composed of a steering wheel 10, a steering torque detecting sensor 11, an assisting multiphase motor 12, an electronic control unit 13 for controlling multiphase motor 12, and the like. Also, steering torque detecting sensor 11 and a reduction gear 16 are housed in a steering column 15 that incorporates a steering shaft 14.

Upon the driver's steering operation, steering torque detecting sensor 11 detects steering torque that acts on steering shaft 14, and electronic control unit 13 controls driving of multiphase motor 12 based on a steering torque signal S1, a vehicle speed signal S2, etc., so that multiphase motor 12 can generate steering assist force corresponding to a running state of the vehicle. When a pinion gear 17 provided on a tip end of steering shaft 14 is rotated thereby, a rack shaft 18 moves horizontally to the right or left in a travel direction. Thus, the driver's steering operation is transmitted to a wheel (tire) 19 to turn the vehicle in a desired direction.

Next, referring to FIGS. 1 to 5, the electronic control unit according to the first embodiment of the present invention is described in more detail. As illustrated in FIG. 1, multiphase (in this example, three-phase) motor 12 includes a first coil set 12a and a second coil set 12b. First coil set 12a includes a U-phase coil Ua, a V-phase coil Va, and a W-phase coil Wa. Second coil set 12b includes a U-phase coil Ub, a V-phase coil Vb, and a W-phase coil Wb. The coil sets 12a, 12b can be driven by a drive circuit 21a in a first system of electronic control unit 13 and a drive circuit 21b in a second system thereof, respectively. Three-phase motor 12 has a rotor 12d equipped with an angle sensor 12e. A signal (angle detection signal) S13 corresponding to a rotational angle of rotor 12d detected by angle sensor 12e is input to microcomputer 20.

Drive circuit 21a of the first system is composed of an inverter circuit 22a, a driver 23a for inverter circuit 22a, a capacitor 24a, a power supply relay (semiconductor relay) 25a, a driver 26a for power supply relay 25a, a current detecting circuit 27a, and the like. Drive circuit 21a is controlled by a microcomputer (CPU) 20. Microcomputer 20 can also function as a diagnosis apparatus for detecting a failure. In this example, drive lines (current supply paths) 1U, 1V, 1W between drive circuit 21a and U-phase coil Ua, V-phase coil Va, and W-phase coil Wa of three-phase motor 12 are provided with phase relays 28U, 28V, 28W that serve as a power supply cutoff element.

A power supply line 37a of inverter circuit 22a is connected to a battery (power supply) BA via power supply relay 25a. Capacitor 24a is connected between power supply line 37a and a ground point. Capacitor 24a assists power supply from battery BA to inverter circuit 22a and also, eliminates noise components such as surge current. As power supply relay 25a, an N-channel MOSFET including a parasitic diode Da is used.

Driver 23a includes H-side driver circuits corresponding to upper arm switching elements (upstream drive elements) for driving U, V and W phases of inverter circuit 22a, and L-side driver circuits corresponding to lower arm switching elements (downstream drive elements). An output terminal of each H-side driver circuit is connected to a control terminal of each upper arm switching element and selectively controlled to be ON/OFF by microcomputer 20. Also, an output terminal of each L-side driver circuit is connected to a control terminal of each lower arm switching element and selectively controlled to be ON/OFF by microcomputer 20. Furthermore, an output terminal of driver 26a is connected to a gate of the N-channel MOSFET that functions as power supply relay 25a and selectively connected to be ON/OFF by microcomputer 20.

Outputs of inverter circuit 22a are supplied from drive lines 1U, 1V, 1W to U-phase coil Ua, V-phase coil Va, and W-phase coil Wa of coil set 12a through drain and source regions of N-channel MOSFETs that function as phase relays 28U, 28V, 28W, respectively. Although not illustrated, phase relays 28U, 28V, 28W are selectively controlled to be ON/OFF by microcomputer 20 to supply current between inverter circuit 22a and coil set 12a or cut off current supply therebetween. In the MOSFETs as phase relays 28U, 28V, 28W, a parasitic diode is formed in a forward direction from the source to the drain.

Connected between U-phase drive line 1U and battery BA is a pull up resistor 6a that functions as a potential applying circuit for applying an intermediate potential to drive line 1U and holding this state. Pull up resistor 6a is configured to apply an intermediate potential between a voltage of battery BA and the ground potential to U-phase drive line 1U. Here, U-phase drive line 1U is connected to pull up resistor 6*a* as a typical example but can be connected to V-phase drive line 1V or W-phase drive line 1W.

Phase potentials of drive lines 1U, 1V, 1W are detected by a phase potential detecting circuit 4*a* and the detection result is input to microcomputer 20. Also, power supply voltage (voltage of power supply line 37*a*) applied to inverter circuit 22*a* is monitored by a power supply voltage monitor circuit 5*a* and the monitoring result is input to microcomputer 20.

Likewise, drive circuit 21*b* of the second system is composed of an inverter circuit 22*b*, a driver 23*b* for inverter circuit 22*b*, a capacitor 24*b*, a power supply relay (semiconductor relay) 25*b*, a driver 26*b* for power supply relay 25*b*, current detecting circuit 27*b*, and the like. Drive circuit 21*b* is controlled by microcomputer 20. Drive lines (current supply paths) 2U, 2V, 2W between drive circuit 21*b* and U-phase coil Ub, V-phase coil Vb, and W-phase coil Wb of three-phase motor 12 are equipped with phase relays 29U, 29V, 29W that function as a power supply cutoff element.

Inverter circuit 22*b* has a power supply line 37*b* connected to battery BA via power supply relay 25*b*. Capacitor 24*b* is connected between power supply line 37*b* and the ground point. Capacitor 24*b* assists power supply from battery BA to inverter circuit 22*b* and eliminates noise components such as surge current. As power supply relay 25*b*, an N-channel MOSFET including a parasitic diode Db is used.

Driver 23*b* includes H-side driver circuits corresponding to upper arm switching elements (upstream drive elements) for driving the U, V, and W phases of inverter circuit 22*b*, and L-side driver circuits corresponding to lower arm switching elements (downstream drive elements) thereof. Output terminals of the respective H-side driver circuits are connected to control terminals of the upper arm switching elements and selectively controlled to be ON/OFF by microcomputer 20. Also, output terminals of the respective L-side driver circuits are connected to control terminals of the lower arm switching elements and selectively controlled to be ON/OFF by microcomputer 20. Furthermore, an output terminal of driver 26*b* is connected to a gate of the N-channel MOSFET that functions as power supply relay 25*b* and selectively controlled to be ON/OFF by microcomputer 20.

An output of inverter circuit 22*b* is supplied from drive lines 2U, 2V, 2W to U-phase coil Ub, V-phase coil Vb, and W-phase coil Wb of coil set 12*b* through drain and source regions of N-channel MOSFETs that function as phase relays 29U, 29V, 29W. Although not illustrated, phase relays 29U, 29V, 29W are selectively controlled to be ON/OFF by microcomputer 20 similar to phase relays 28U, 28V, 28W, to thereby supply current between inverter circuit 22*b* and coil set 12*b* or cut off the current supply. In the MOSFETs as phase relays 29U, 29V, 29W, a parasitic diode is formed in a forward direction from the source to the drain.

Connected between U-phase drive line 2U and battery BA is a pull up resistor 6*b* for applying an intermediate potential to drive line 2U and holding this state. Pull up resistor 6*b* applies an intermediate potential between voltage of battery BA and the ground potential to U-phase drive line 2U. Here, U-phase drive line 2U is connected to pull up resistor 6*b* as a typical example, but can be connected to V-phase drive line 2V or W-phase drive line 2W.

Phase potentials of drive lines 2U, 2V, 2W are detected by a phase potential detecting circuit 4*b* and the detection result is input to microcomputer 20. Also, power supply voltage (voltage of power supply line 37*b*) applied to inverter circuit 22*b* is monitored by power supply voltage monitor circuit 5*b* and the monitoring result is input to microcomputer 20.

Microcomputer 20 receives steering torque signal S1 and vehicle speed signal S2 from the EPS system, and also receives detection signals S3 to S8 of current detecting circuits 27*a*, 27*b* in electronic control unit 13, signals S9*a* to S11*a* and signals S9*b* to S11*b* corresponding to phase potentials detected by phase potential detecting circuits 4*a*, 4*b*, signals S12*a*, S12*b* corresponding to power supply voltages of first and second inverter circuits 22*a*, 22*b* monitored by power supply voltage monitor circuits 5*a*, 5*b*, and the like. Also, microcomputer 20 receives an angle detection signal S13 from angle sensor 12*e* provided in three-phase motor 12. Microcomputer 20 determines whether a short-circuit failure has occurred between coil sets 12*a* and 12*b* or between inverter circuits 22*a* and 22*b* based on signals S3 to S8, S9*a* to S11*a*, S9*b* to S11*b*, S12*a*, S12*b*, etc. Then, if no short-circuit failure has occurred, microcomputer 20 controls drive circuits 21*a* and 21*b* based on signals S1, S2, S13, etc. to drive three-phase motor 12, so as to generate steering assist force corresponding to a running state of a vehicle.

Figure 2:
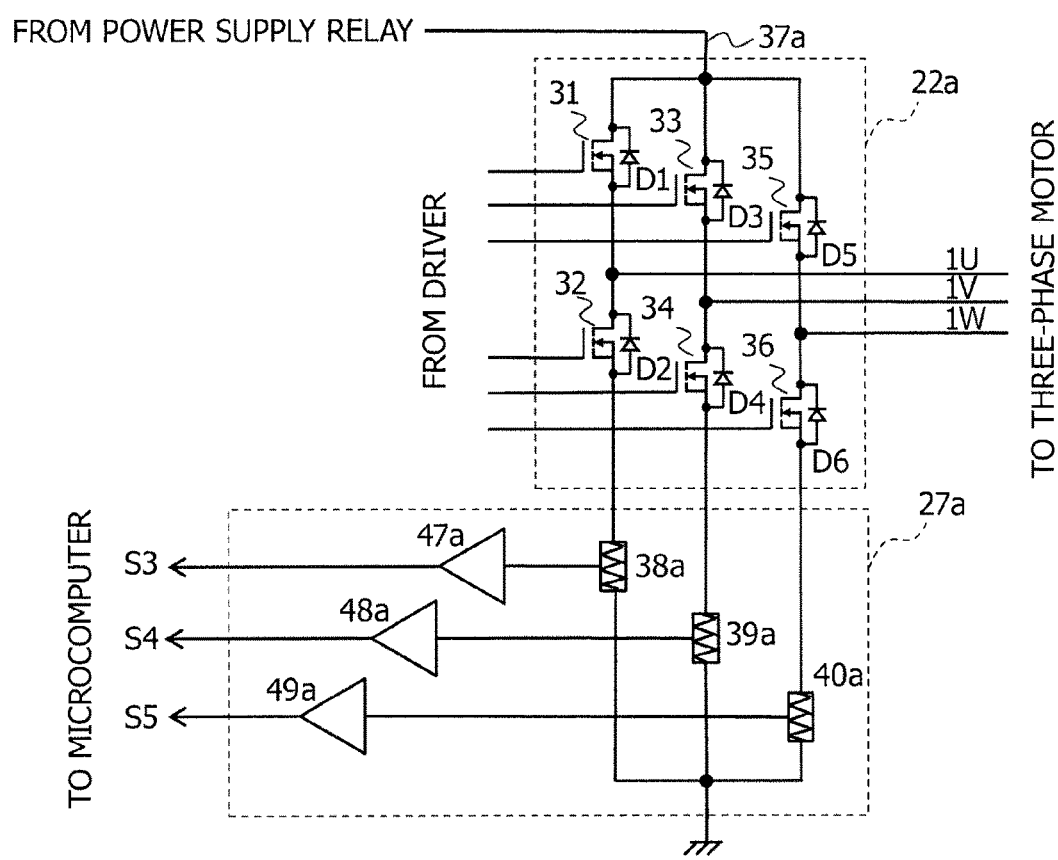
FIG. 2 is a circuit diagram illustrating a configuration example of an inverter circuit of a first system of FIG. 1 and a current detecting circuit thereof.

FIG. 2 illustrates a configuration example of inverter circuit 22*a* and current detecting circuit 27*a* of FIG. 1. Inverter circuit 22*a* has three-phase bridge circuit configuration with three sets of switching elements for driving U-phase coil Ua, V-phase coil Va, and W-phase coil Wa of three-phase motor 12 on a phase basis via drive lines 1U, 1V, 1W. In this example, the switching elements are configured using N-channel MOSFETs 31 to 36. Current detecting circuit 27*a* is composed of current detecting resistors 38*a* to 40*a* and buffers 47*a* to 49*a* for amplifying voltages (corresponding to currents flowing through the three-phase bridge circuit) detected by current detecting resistors 38*a* to 40*a*.

In MOSFETs 31, 32, drain and source regions are series-connected between power supply line 37*a* and one end of current detecting resistor 38*a*, and their common node is connected to one end of drive line 1U. In MOSFETs 33, 34, drain and source regions are series-connected between power supply line 37*a* and one end of current detecting resistor 39*a*, and their common node is connected to one end of drive line 1V. In MOSFETs 35 and 36, drain and source regions are series-connected between power supply line 37*a* and one end of current detecting resistor 40*a*, and their common node is connected to one end of drive line 1W.

The other ends of current detecting resistors 38*a* to 40*a* are grounded, and voltages detected by current detecting resistors 38*a* to 40*a* are input to buffers 47*a* to 49*a*. Outputs of buffers 47*a* to 49*a* are input to microcomputer 20 as detection signals S3 to S5 corresponding to currents flowing through inverter circuit 22*a*.

Note that diodes D1 to D6 connected in the forward direction between the source and drain in MOSFETs 31 to 36 are parasitic diodes.

Figure 3:
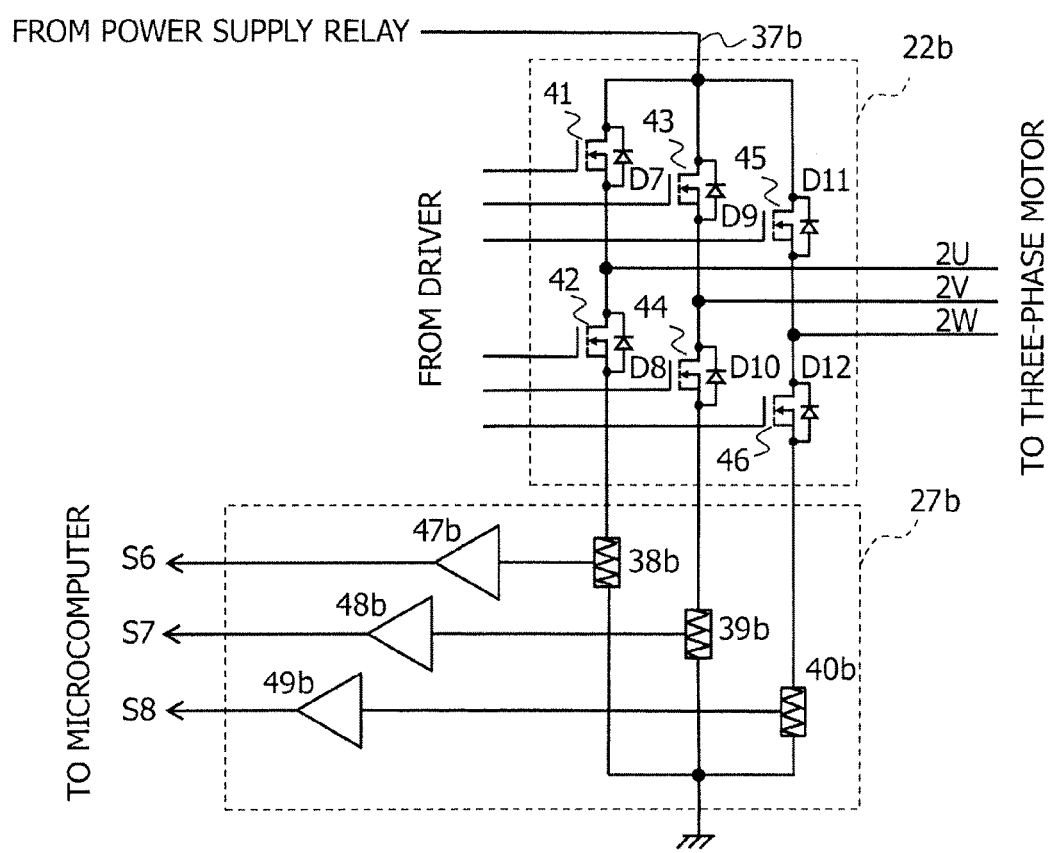
FIG. 3 is a circuit diagram illustrating a configuration example of an inverter circuit of a second system of FIG. 1 and a current detecting circuit thereof.

FIG. 3 illustrates a configuration example of inverter circuit 22*b* and current detecting circuit 27*b* of FIG. 1. Inverter circuit 22*b* has the same circuit configuration as inverter circuit 22*a*, i.e., has three-phase bridge circuit configuration with three sets of switching elements for driving U-phase coil Ub, V-phase coil Vb, and W-phase coil Wb of three-phase motor 12 on a phase basis via drive lines 2U, 2V, 2W. Similar to the above, the switching elements are configured using N-channel MOSFETs 41 to 46. Also, current detecting circuit 27*b* is composed of current detecting resistors 38*b* to 40*b* and buffers 47*b* to 49*b* for amplifying voltages (corresponding to currents flowing through the three-phase bridge circuit) detected by current detecting resistors 38*b* to 40*b*, similar to current detecting circuit 27*a*.

In MOSFETs 41, 42, drain and source regions are series-connected between power supply line 37b and one end of current detecting resistor 38b, and their common node is connected to one end of drive line 2U. In MOSFETs 43, 44, drain and source regions are series-connected between power supply line 37b and one end of current detecting resistor 39b, and their common node is connected to one end of drive line 2V. In MOSFETs 45, 46, drain and source regions are series-connected between power supply line 37b and one end of current detecting resistor 40b, and their common node is connected to one end of drive line 2W.

The other ends of current detecting resistors 38b to 40b are grounded, and voltages detected by current detecting resistors 38b to 40b are supplied to buffers 47b to 49b, respectively. Outputs of buffers 47b to 49b are input to microcomputer 20 as detection signals S6 to S8 corresponding to currents flowing through inverter circuit 22b.

Diodes D7 to D12 connected in the forward direction between the source and drain in MOSFET 41 to 46 are parasitic diodes.

Figure 4:
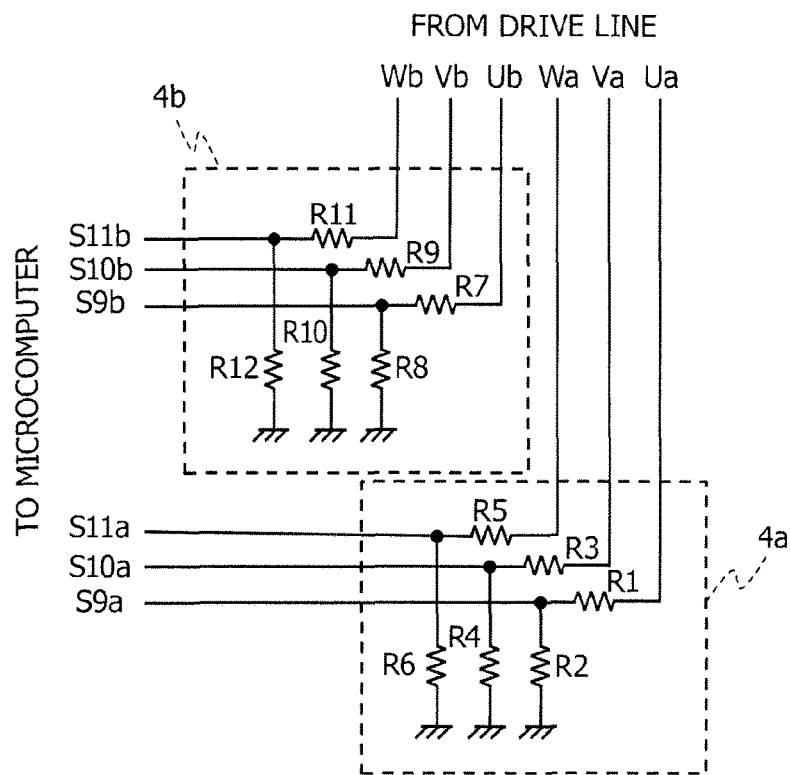
FIG. 4 is a circuit diagram illustrating a configuration example of first and second phase potential detecting circuits of FIG. 1.

FIG. 4 illustrates a configuration example of phase potential detecting circuits 4a, 4b of FIG. 1. Phase current detecting circuits 4a, 4b detect potentials of drive lines 1U, 1V, 1W, and drive lines 2U, 2V, 2W from inverter circuits 22a, 22b to coil sets 12a, 12b, respectively, on a phase basis. Phase current detecting circuit 4a is composed of series-connected resistors R1, R2, resistors R3, R4, and resistors R5, R6 between drive lines 1U, 1V, 1W and the ground point, respectively. Phase current detecting circuit 4b is composed of series-connected resistors R7, R8, resistors R9, R10, and resistors R11, R12 between drive lines 2U, 2V, 2W and the ground point.

Then, the potentials at the nodes between resistors R1 and R2, resistors R3 and R4, and resistors R5 and R6 are input to microcomputer 20 as signals S9a to S11a corresponding to detection potentials of U-phase coil Ua, V-phase coil Va, and W-phase coil Wa of coil set 12a. Also, the potentials at the nodes between resistors R7 and R8, resistors R9 and R10, and resistors R11 and R12 are input to microcomputer 20 as signals S9b to S11b corresponding to detection potentials of U-phase coil Ub, V-phase coil Vb, and W-phase coil Wb of coil set 12b.

Figure 5:
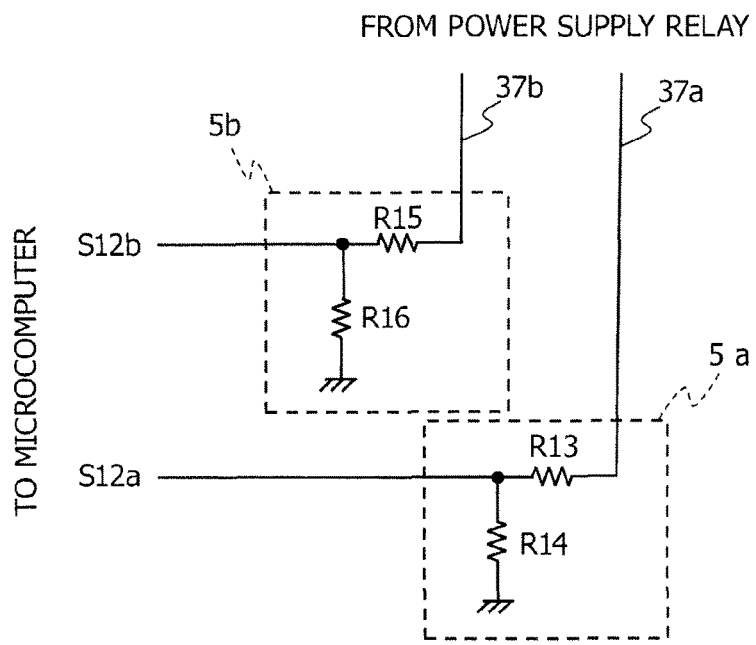
FIG. 5 is a circuit diagram illustrating a configuration example of first and second power supply voltage monitor circuits of FIG. 1.
Figure 6:
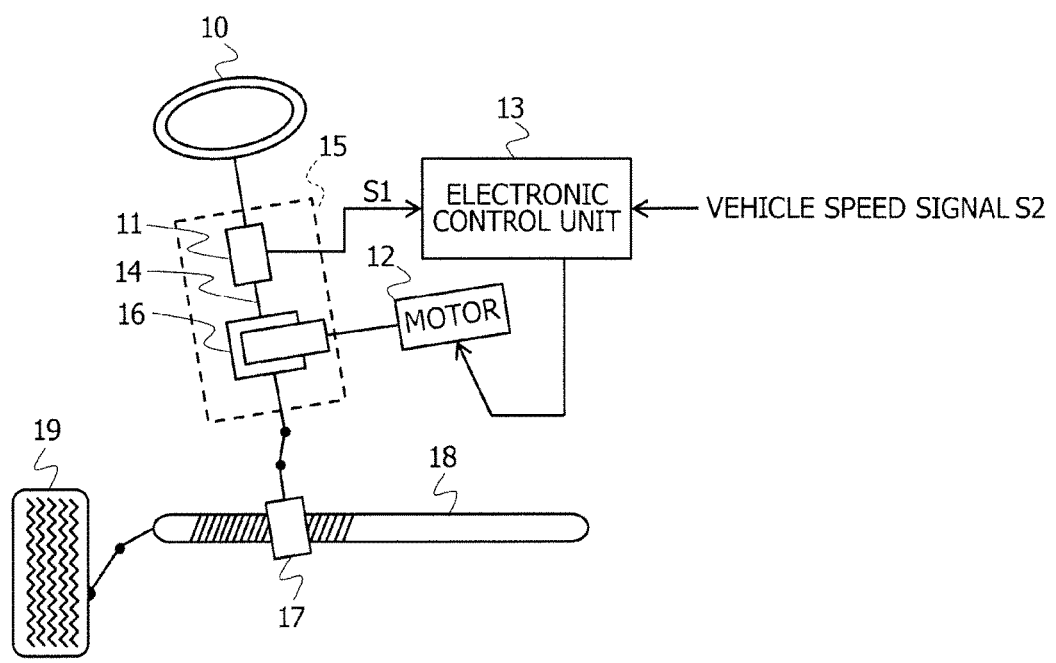
FIG. 6 is a schematic diagram of an electric power steering system to which the electronic control unit of FIGS. 1 to 5 is applied.

FIG. 5 illustrates a configuration example of power supply voltage monitor circuits 5a, 5b of FIG. 1. Power supply voltage monitor circuits 5a, 5b monitor operating power supply voltage of inverter circuits 22a, 22b. Power supply voltage monitor circuits 5a, 5b are composed of series-connected resistors R13, R14, and resistors R15, R16 between power supply lines 37a, 37b of inverter circuits 22a, 22b and the ground point. The potentials at the node between resistors R13 and R14 and the node between resistors R15 and R16 are input to microcomputer 20 as signals S12a and S12b.

Figure 7:
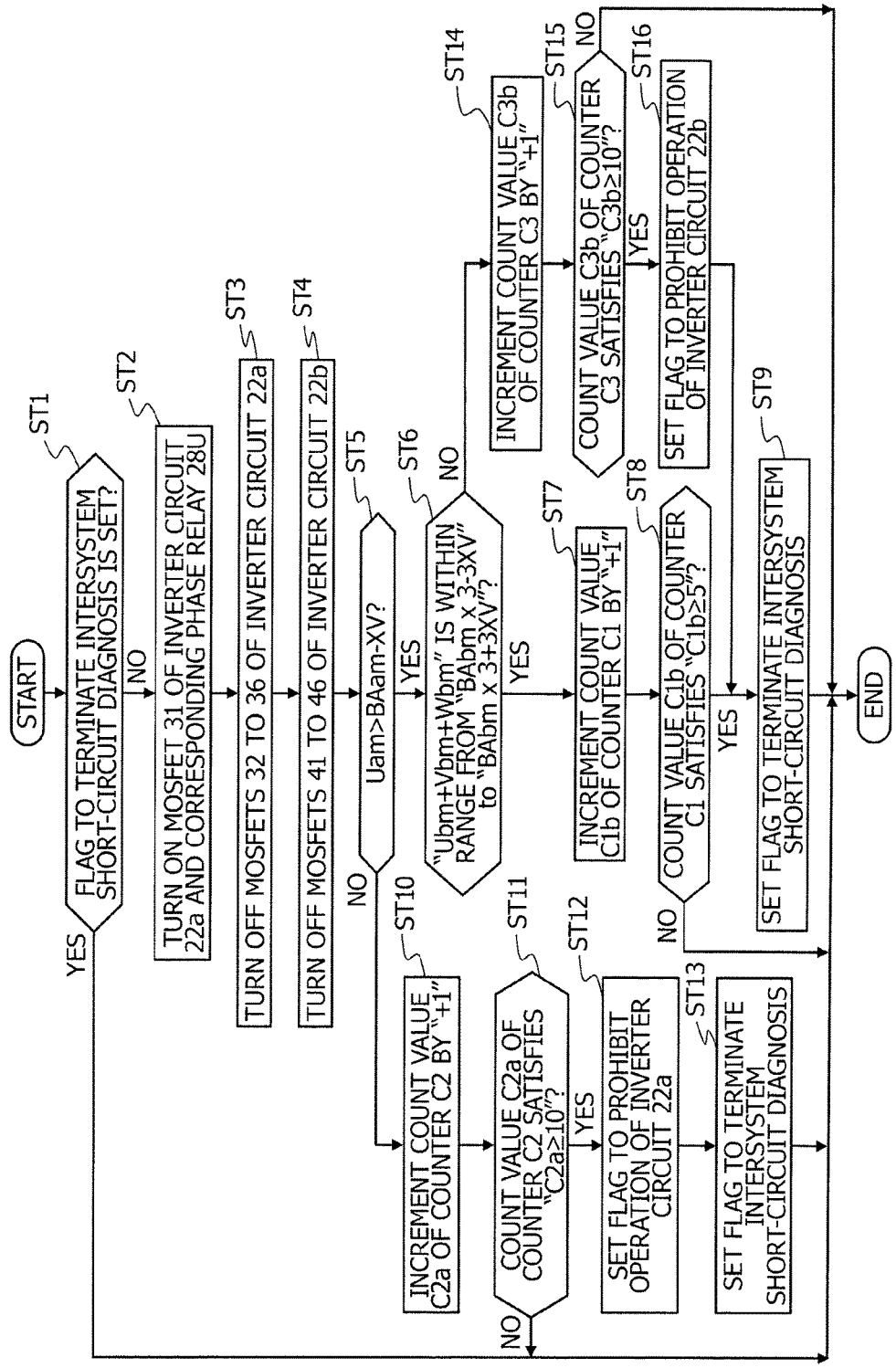
FIG. 7 is a flowchart illustrating a control method for the electronic control unit according to the first embodiment of the present invention.

Next, referring to a flowchart of FIG. 7, a failure diagnosis operation of the electronic control unit illustrated in FIGS. 1 to 5 is described. The failure diagnosis operation is started and executed plural times at predetermined time intervals (for example, in milliseconds) prior to starting the control of three-phase motor 12. This diagnosis operation is outlined below. That is, an output in one phase of the inverter circuit in the drive circuit of one system is set to a high level, while outputs in all phases of the inverter circuit in the drive circuit of the other system are set to a high impedance (Hi-Z). At this time, if a phase potential of a drive line in the inverter circuit of the other system is not changed, it is confirmed that no short-circuit failure has occurred in this phase. If the phase potential is changed almost close to the output potential of the inverter circuit of the one system, it is determined that a short-circuit failure has occurred. By executing such a diagnosis operation, a short-circuit failure is detected without supplying a current to the coil or drive circuit.

Next, the diagnosis operation is detailed below. First, it is determined whether a flag is set, which indicates the completion of intersystem short-circuit diagnosis (step ST1). If the flag is set, the operation is terminated. Otherwise, the diagnosis is started.

In step ST2, the U-phase upper arm switching element in inverter circuit 22a of the first system is controlled to be ON and also, corresponding phase relay 28U is controlled to be ON (current supplied). More specifically, U-phase MOSFET 31 in inverter circuit 22a of driver 23a is controlled to be ON by driver 23a under the control of microcomputer 20. Also, the MOSFET as U-phase phase relay 28U is controlled to be ON.

In step ST3, MOSFETs 32 to 36 as the U-phase lower arm switching element, the V-phase upper arm switching element, the V-phase lower arm switching element, the W-phase upper arm switching element, and W-phase lower arm switching element of inverter circuit 22a in the first system, are controlled to be OFF. As a result, an output level of inverter circuit 22a becomes high in the U phase, and a high-impedance output is obtained with the V and W phases.

In step ST4, the MOSFETs 41 to 46 as the U-phase upper arm switching element, the U-phase lower arm switching element, the V-phase upper arm switching element, the V-phase lower arm switching element, the W-phase upper arm switching element, and the W-phase lower arm switching element of inverter circuit 22b in the second system, are controlled to be OFF. As a result, a high-impedance output is obtained with all phases of inverter circuit 22b.

In a subsequent step ST5, microcomputer 20 determines whether a monitored value Uam of a U-phase potential of inverter circuit 22a in the first system detected by phase potential detecting circuit 4a is larger than a monitored value BAam of power supply voltage of inverter circuit 22a detected by power supply voltage monitor circuit 5a. In this example, whether "Uam>BAam-XV" is determined with an allowance of a predetermined voltage XV (about 1 volt).

If "Uam>BAam-XV", no failure has occurred. Then, it is determined whether the total sum "Ubm+Vbm+Wbm" of a monitored value Ubm of U-phase potential, a monitored value Vbm of V-phase potential, and a monitored value Wbm of W-phase potential, of inverter circuit 22b in the second system, is within a range from "BAbm (monitored value of power supply voltage in inverter circuit 22b)×3−3XV" to "BAbm (monitored value of power supply voltage in inverter circuit 22b)×3+3XV" (step ST6). Here, "−3XV" and "+3XV" indicate that an allowance of predetermined voltage XV is added to monitored value BAbm.

Note that the above detection of phase potentials is applicable to one or two phases or N phases (N is an arbitrary value). In the case of one-phase detection, it is determined whether a potential of any one phase (for example, Ubm) is within a range from "BAbm+XV" to "BAbm−XV" in step ST6. In the case of two-phase detection, it is determined whether potentials of any two phases (for example, Ubm+Vbm) are within a range from "BAbm×2+2XV" to "BAbm×2−2XV". Moreover, in the case of N-phase detection, it is determined whether potentials of any N phases (for example, N1bm+N2Vbm) is within a range from "BAbm×N+NXV" to "BAbm×N−NXV".

If it is determined in step ST6 that the potential is within a target range (normal), a count value C1b of a counter C1 indicating that no intersystem short-circuit has occurred in the second system is incremented by "+1" (step ST7).

Next, it is determined whether count value C1b of counter C1 satisfies "C1b≥5" (step ST8). If "C1b≥5", it is determined that no short-circuit has occurred between the first and second systems, and the flag to terminate the intersystem short-circuit diagnosis, is set (step ST9) to terminate the diagnosis. Counter C1 is configured so that when it is determined plural times (in this example, five or more times) that no short-circuit has occurred between the first and second systems, the intersystem short-circuit diagnosis is ended. With this configuration, counter C1 improves the accuracy and reliability of failure detection.

Microcomputer 20 starts the failure diagnosis operation at predetermined time intervals. If detecting that the flag to terminate the intersystem short-circuit diagnosis is set in step ST1, microcomputer 20 ends the failure diagnosis and starts assist control of three-phase motor 12 and then shifts to a normal operation.

If "C1b≥5" is not satisfied in step ST8, this means that it is determined less than four times that no short-circuit has occurred. Then, the diagnosis is ended, followed by waiting for the next failure diagnosis operation to start after a predetermined time.

On the other hand, if it is determined that "Uam>BAam-XV" is not satisfied, i.e., a failure has occurred in step ST5, a count value C2a of a counter C2 indicating that a failure occurs upon applying a high-level potential to U-phase drive line 1U of the first system, is incremented by "+1" (step ST10).

Subsequently, it is determined whether count value C2a of counter C2 satisfies "C2a≥10" (step ST11). If "C2a≥10", it is determined that the first system has failed (failure confirmed), and a flag to prohibit operation of inverter circuit 22a is set (step ST12). Then, the flag to terminate the intersystem short-circuit diagnosis is set to terminate the diagnosis (step ST13).

If it is determined that "C2a≥10" is not satisfied in step ST11, the diagnosis is ended, followed by waiting for the next failure diagnosis operation to start after a predetermined time.

Moreover, if it is determined that the value is not within a target range (failed) in step ST6, a count value C3b of a counter C3 indicating that intersystem short-circuit has occurred in the second system, is incremented by "+1" (step ST14).

Subsequently, it is determined whether count value C3b of counter C3 satisfies "C3b≥10" (step ST15). If "C3b≥10", it is determined that the second system has failed (failure confirmed), and the flag to prohibit operation of inverter circuit 22b is set (step ST16). Then, the operation proceeds to step ST9, at which the flag to terminate the intersystem short-circuit diagnosis is set to terminate the diagnosis.

If it is determined that "C3b≥10" is not satisfied in step ST15, the diagnosis is ended, followed by waiting for the next failure diagnosis operation to start after a predetermined time.

When detecting that the flag to terminate the intersystem short-circuit diagnosis is set in step ST9 and ST13, microcomputer 20 starts normal motor control operation. During the normal operation, drive circuit 21a of the first system and drive circuit 21b of the second system supply currents to three-phase motor 12, and the motor is driven with the added current of two systems in total.

In a normal assist state with first and second drive circuits 21a and 21b, microcomputer 20 outputs, for example, a pulse width modulation signal (PWM signal) to drivers 23a, 23b. Also, signals for turning on power supply relays 25a, 25b are output to drivers 26a, 26b. Each H-side driver and each L-side driver in drivers 23a, 23b transmit drive signals based on PWM signals to gates of MOSFETs 31 to 36 and MOSFETs 41 to 46 in inverter circuits 22a, 22b of the first and second systems, respectively, thereby selectively controlling the gates to be ON/OFF.

Then, three-phase motor 12 is driven in three phases by drive circuit 21a via drive lines 1U, 1V, 1W and also driven in three phases by drive circuit 21b via drive lines 2U, 2V, 2W. At this time, a duty ratio of the PWM signal is set variable based on steering torque signal S1, vehicle speed signal S2, etc. to control an output torque of three-phase motor 12 and in turn, change assist force.

When detecting that the flag to prohibit operation of inverter circuit 22a of the first system is set in step ST12, microcomputer 20 controls all MOSFETs 31 to 36 of inverter circuit 22a to be OFF and holds high-impedance output thereof. In this state, the motor control operation with drive circuit 21b of the second system is executed.

In contrast, when detecting that the flag to prohibit operation of inverter circuit 22b of the second system is set in step ST16, microcomputer 20 controls all MOSFETs 41 to 46 of inverter circuit 22b to be OFF and holds high-impedance output thereof. In this state, the motor control operation with drive circuit 21a of the first system is executed.

The steering assist force generated by either drive circuit 21a or drive circuit 21b is reduced to ½ of that generated by both of them. Nevertheless, since the assist operation can be continued, the decline in safety, caused by sudden stop of assist force, can be prevented.

Note that in the control method of FIG. 7, MOSFET 31 of inverter circuit 22a in the first system is controlled to be ON and also, phase relay 28U is controlled to be ON, increasing a potential of drive line 1U. Then, a short-circuit failure is detected based on whether the potential affects inverter circuit 22b of the second system. However, the following configuration is also conceivable. That is, MOSFET 32 of inverter circuit 22a of the first system is controlled to be ON and also, phase relay 28U is controlled to be OFF, thereby lowering a potential of drive line 1U. Then, a short-circuit failure is detected based on whether the potential affects inverter circuit 22b of the second system. If no short-circuit has occurred, drive lines 2U, 2V, 2W of the second system have an intermediate potential. If a short-circuit has occurred, their potentials are reduced to low level due to the reduction in phase potential of drive line 1U in the first system. Based on this, the presence/absence of a short-circuit failure can be determined.

By repeatedly executing on the V phase and the W phase as well as the U phase, the diagnosis operations under the condition that one of the upper arm switching element and the lower arm switching element in inverter circuit 22b (or 22a) is controlled to ON in one system and alternately controlled to be OFF in the other system, and the output of inverter circuit 22b (or 22a) of the other system is controlled to be a high impedance, the presence/absence of a short-circuit failure can be more accurately determined.

In addition, if first phase potential detecting circuit 4a can detect a potential corresponding to a state in which one of the upper arm switching element and the lower arm switching element corresponding to one phase of first coil set 12a is controlled to be ON, and the other is controlled to be OFF in inverter circuit 22a of the first system, it can be determined that inverter circuit 22a of the first system is normal. In this state, an output of inverter circuit 22b of the second system is set to high impedance. Under this condition, if a potential detected by second phase potential detecting circuit 4b is equivalent to an output potential of inverter circuit 22a of the first system, it is determined that a short-circuit failure has occurred. This makes it possible to detect a short-circuit failure as well as a current supply failure (disconnection, short-circuit, and failed element) in inverter circuit 22a of the first system and in turn, to improve the detection accuracy and reliability.

Also, in the case where parasitic diodes of phase relays 28U, 28V, 28W and phase relays 29U, 29V, 29W are formed in the forward direction from first and second coil sets 12a and 12b to inverter circuits 22a and 22b of the first and second systems, the diagnosis can be made under the condition that MOSFETs 31, 33, 35 as upper arm switching elements in all phases are controlled to be ON, and MOSFETs 32, 34, 36 as lower arm switching elements in all phases and phase relays 28U, 28V, 28W are controlled to be OFF. If not short-circuited, drive lines 2U, 2V, 2W of the second system have the intermediate potential. If short-circuited, their level becomes high due to an increase in phase potential of drive lines 1U, 1V, 1W in the first system. Based on this, the presence/absence of a short-circuit failure can be determined.

Moreover, in the case where parasitic diodes of phase relays 28U, 28V, 28W and phase relays 29U, 29V, 29W are formed in the forward direction from inverter circuits 22a and 22b of the first and second systems to first and second coil sets 12a and 12b, the diagnosis can be made under the condition that MOSFETs 31, 33, 35 as upper arm switching elements in all phases are controlled to be OFF, and MOSFETs 32, 34, 36 as lower arm switching elements in all phases, and phase relays 28U, 28V, 28W are controlled to be ON. If not short-circuited, drive lines 2U, 2V, 2W of the second system have the intermediate potential. If short-circuited, their level becomes low due to reduction in phase potential of drive lines 1U, 1V, 1W in the first system.

Furthermore, if the diagnosis is executed with phase relays 28U, 28V, 28W being controlled to be ON, phase relays 28U, 28V, 28W themselves can be also diagnosed. When phase relays 28U, 28V, 28W are controlled to be ON to shift the output of inverter circuit 22a to high level, a high-level detection value of phase potential detecting circuit 4b is obtained as long as the phase relay is normally turned ON. In contrast, if any phase relay has failed and cannot be turned ON, this phase remains at an intermediate potential. Hence, it can be estimated whether the phase relay or the inverter circuit has failed. Accordingly, a gate-to-gate short-circuit as well as the phase-to-phase short-circuit can be checked.

As described above, in the control method for the electronic control unit according to the first embodiment of the present invention, the diagnosis as to short-circuit failure is executed with the output of the inverter circuit of one system being controlled to be high impedance, based on whether the phase potential on the inverter circuit side of the other system is transmitted. That is, when the potential in each phase of the inverter circuit of one system is equivalent to an output potential of the inverter circuit of the other system, it is determined that a short-circuit failure has occurred. Accordingly, even if a short-circuit failure has occurred between two coil sets or two inverter circuits, a current path through which a current is supplied from the power supply to the ground point is not formed and a large current does not flow. As a result, a short-circuit failure can be detected without abnormal current supply to each coil of the three-phase motor or the drive circuit thereof.

Second Embodiment

Figure 8:
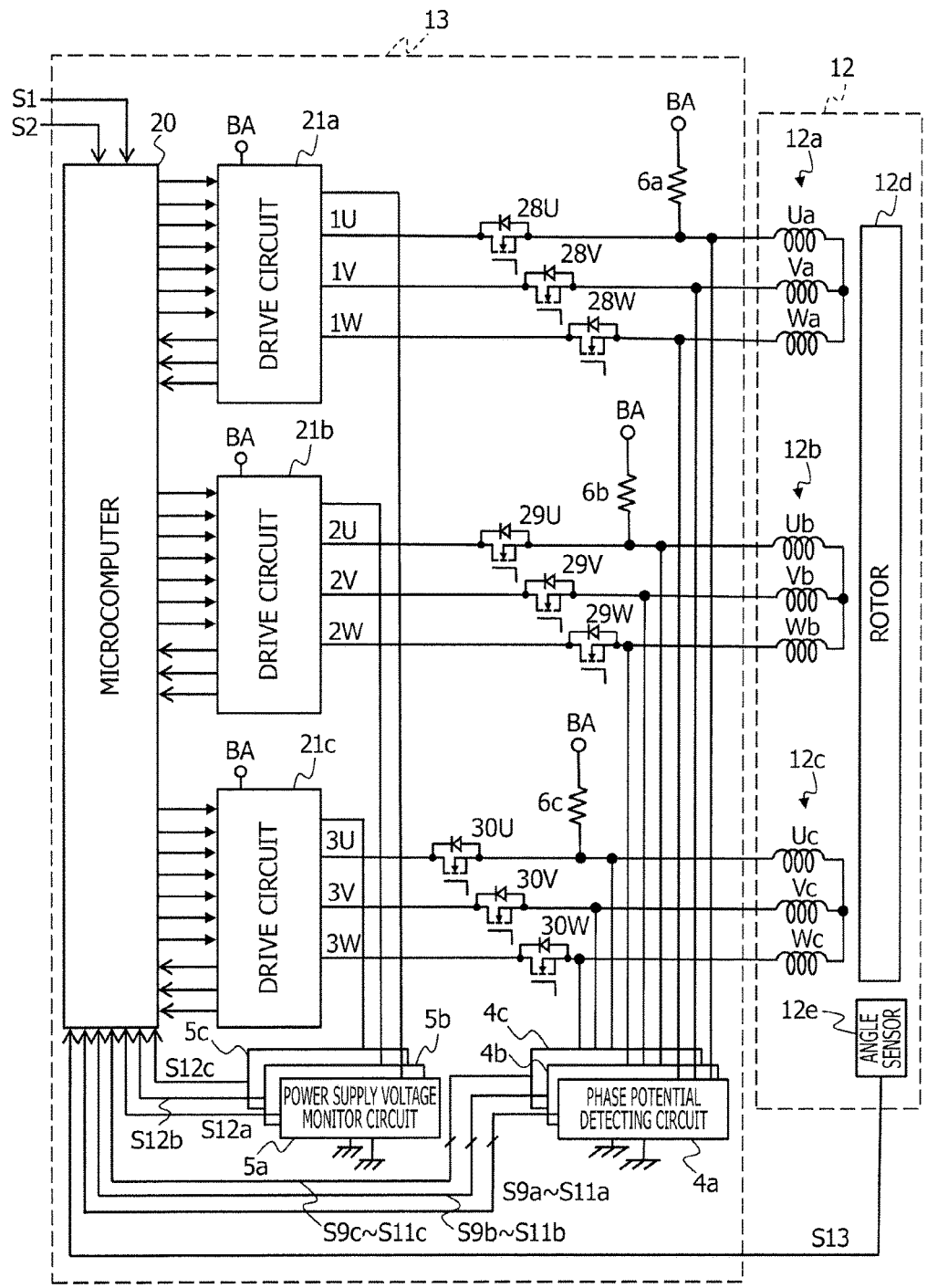
FIG. 8 is a circuit diagram illustrating a configuration example of an electronic control unit according to a second embodiment of the present invention.

FIG. 8 illustrates an electronic control unit according to a second embodiment of the present invention. In FIG. 8, three-phase motor 12 includes first, second, and third coil sets 12a, 12b, and 12c, and electronic control unit 13 includes first, second, and third drive circuits 21a, 21b, and 21c corresponding to these coil sets. Coil sets 12a, 12b, 12c include coils Ua, Va, Wa, coils Ub, Vb, Wb, and coils Uc, Vc, Wc. Then, coil sets 12a, 12b, 12c can be separately driven by drive circuits 21a, 21b, 21c of the first, second, and third systems.

Similar to the first embodiment of FIG. 1, drive circuits 21a, 21b, 21c include an inverter circuit, a driver for the inverter circuit, a capacitor, a power supply relay, a driver for the power supply relay, a current detecting circuit, and the like.

Outputs of the inverter circuits in drive circuits 21a, 21b, 21c are supplied from drive lines 1U, 1V, 1W, drive lines 2U, 2V, 2W, and drive line 3U, 3V, 3W to coil sets 12a, 12b, 12c via phase relays 28U, 28V, 28W, phase relays 29U, 29V, 29W, and phase relays 30U, 30V, 30W. In MOSFTs as the above phase relays, parasitic diodes are formed in the forward direction from the source to the drain.

Pull up resistors 6a, 6b, 6c are connected between coils Ua, Ub, Uc and battery BA, respectively. Furthermore, phase potentials of drive lines 1U, 1V, 1W, drive lines 2U, 2V, 2W, and drive lines 3U, 3V, 3W are detected by phase potential detecting circuits 4a, 4b, 4c for each system. Signals S9a to S11a, S9b to S11b, and S9c to S11c indicating the detection result are input to microcomputer 20. Moreover, power supply voltages of inverter circuits 22a, 22b, 22c in drive circuits 21a, 21b, 21c are monitored by power supply voltage monitor circuits 5a, 5b, 5c and signals S12a, S12b, S12c indicating the monitoring result are input to microcomputer 20.

As described above, since the basic configuration is the same as the first embodiment, a detailed description of drive circuits 21a, 21b of the first and second systems is omitted.

Figure 9:
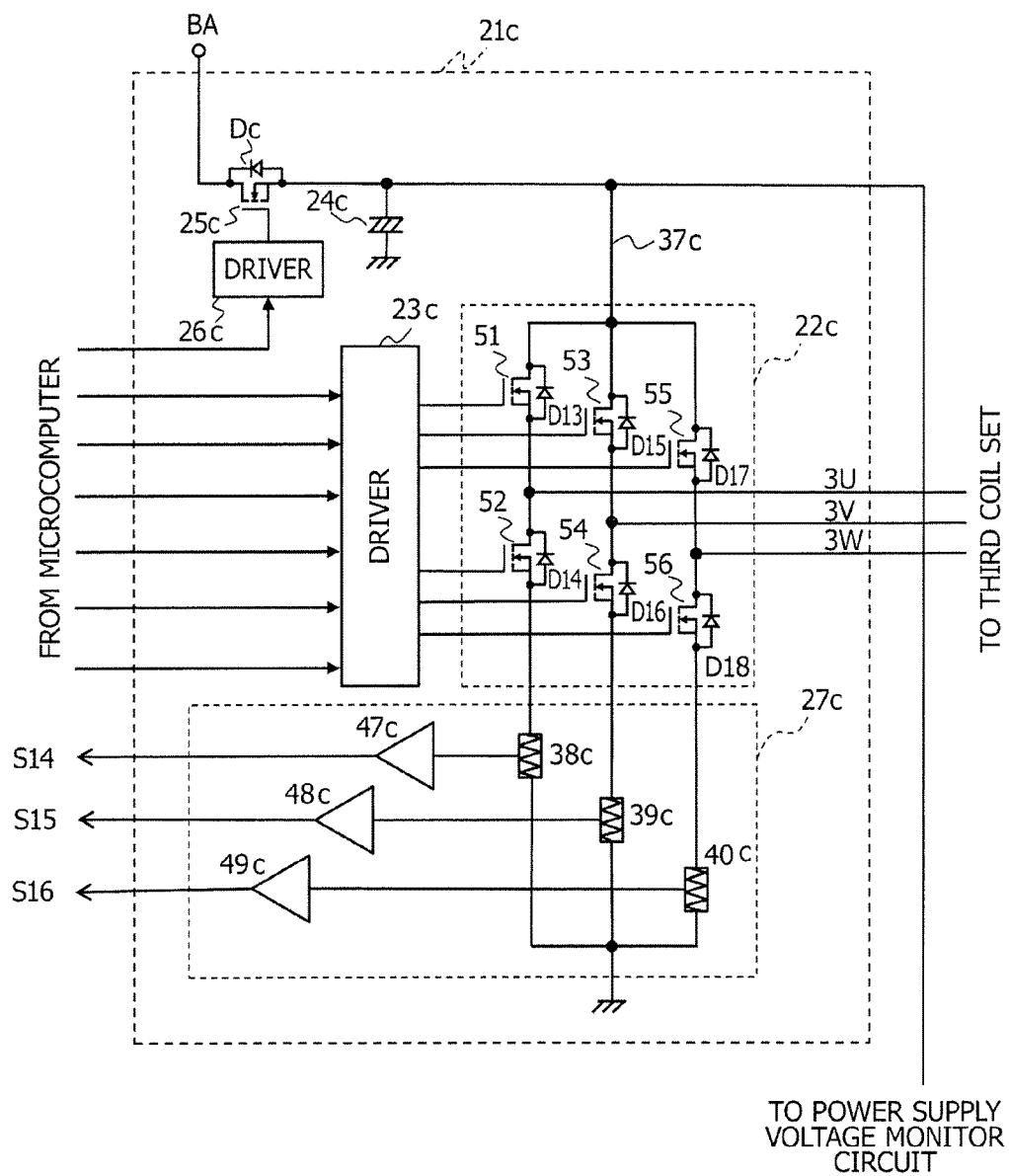
FIG. 9 is a circuit diagram illustrating a configuration example of a drive circuit in a third system of FIG. 2.

FIG. 9 illustrates a configuration example of drive circuit 21c of the third system in electronic control unit 13 of FIG. 8. Similar to drive circuits 21a, 21b of the first and second systems, drive circuit 21c of the third system includes an inverter circuit 22c, a driver 23c for inverter circuit 22c, a capacitor 24c, a power supply relay 25c, a driver 26c for power supply relay 25c, a current detecting circuit 27c, and the like.

Power supply line 37c of inverter circuit 22c is connected to battery (power supply) BA via power supply relay 25c. Capacitor 24c is connected between power supply line 37c and the ground point. Capacitor 24c assists power supply from battery BA to inverter circuit 22c as well as eliminates noise components such as surge current. An N-channel MOSFET including a parasitic diode Dc is used as power supply relay 25c.

Driver 23c includes H-side driver circuits corresponding to upper arm switching elements (upstream drive elements; in FIG. 9, N-channel MOSFETs) for driving a U-phase, a V-phase, and a W-phase of inverter circuit 22c, and L-side driver circuits corresponding to lower arm switching elements (downstream drive elements; in FIG. 9, N-channel MOSFETs) thereof. Control terminals of the upper arm switching elements are connected to output terminals of the respective H-side driver circuits and selectively controlled to be ON/OFF by microcomputer 20. Moreover, output terminals of the L-side driver circuits are connected to control terminals of the lower arm switching elements and selectively controlled to be ON/OFF by microcomputer 20. An output terminal of driver 26c is connected to a gate of the N-channel MOSFET that functions as power supply relay 25c and selectively controlled to be ON/OFF by microcomputer 20.

Inverter circuit 22c is a three-phase bridge circuit configuration with three sets of switching elements for driving the U-phase, the V-phase, and the W-phase of multiphase motor 12 on a phase basis via drive lines (current supply paths) 3U, 3V, 3W. In this example, the switching elements are configured by N-channel MOSFETs 51 to 56. Current detecting circuit 27c is composed of current detecting resistors 38c to 40c and buffers 47c to 49c for amplifying voltages (corresponding to currents flowing through the three-phase bridge circuit) detected by current detecting resistors 38c to 40c.

In MOSFETs 51, 52, drain and source regions are series-connected between power supply line 37c and one end of current detecting resistor 38c, and their common node is connected to one end of drive line 3U. In MOSFETs 53, 54, drain and source regions are series-connected between power supply line 37c and one end of current detecting resistor 39c, and their common node is connected to one end of drive line 3V. Also, in MOSFETs 55, 56, drain and source regions are series-connected between power supply line 37c and one end of current detecting resistor 40c, and their common node is connected to one end of drive line 3W.

The other ends of current detecting resistors 38c to 40c are grounded, and voltages detected by current detecting resistors 38c to 40c are input to buffers 47c to 49c, respectively. The outputs of buffers 47c to 49c are input to microcomputer 20 as detection signals S14 to S16 corresponding to currents flowing through inverter circuit 22c.

Note that, diodes D13 to D18 connected in the forward direction between the source and drain in MOSFETs 51 to 56 are parasitic diodes.

Next, referring to flowcharts of FIGS. 10 to 14, the failure diagnosis operation of the electronic control unit in FIGS. 8 and 9 is explained. The failure diagnosis operation of the control method according to the second embodiment is started and executed plural times at predetermined time intervals (for example, in milliseconds) prior to starting the control of the three-phase motor similar to the first embodiment. The diagnosis operation is outlined below. That is, the output of one phase in the inverter circuit of the drive circuit in the first system is set to a high level and the outputs of all phases in the inverter circuit of the drive circuit in the second and third systems are set to a high impedance (Hi-Z). At this time, if the phase potential of the drive line in the inverter circuit of the second and third systems is not changed, it is determined that no short-circuit failure has occurred in the phase concerned. However, it is not sure whether a short-circuit failure has occurred in the inverter circuits of the second third systems. Then, the output of one phase in the inverter circuit of the second system is set to a high level, and the outputs of all phases of the inverter circuit in the third system are set to a high impedance and under such a condition, the diagnosis is performed as to a short-circuit failure between the inverter circuits of the second and third systems. By executing the diagnosis operation, the short-circuit failure is detected without supplying a current to the coil or drive circuit.

Figure 10:
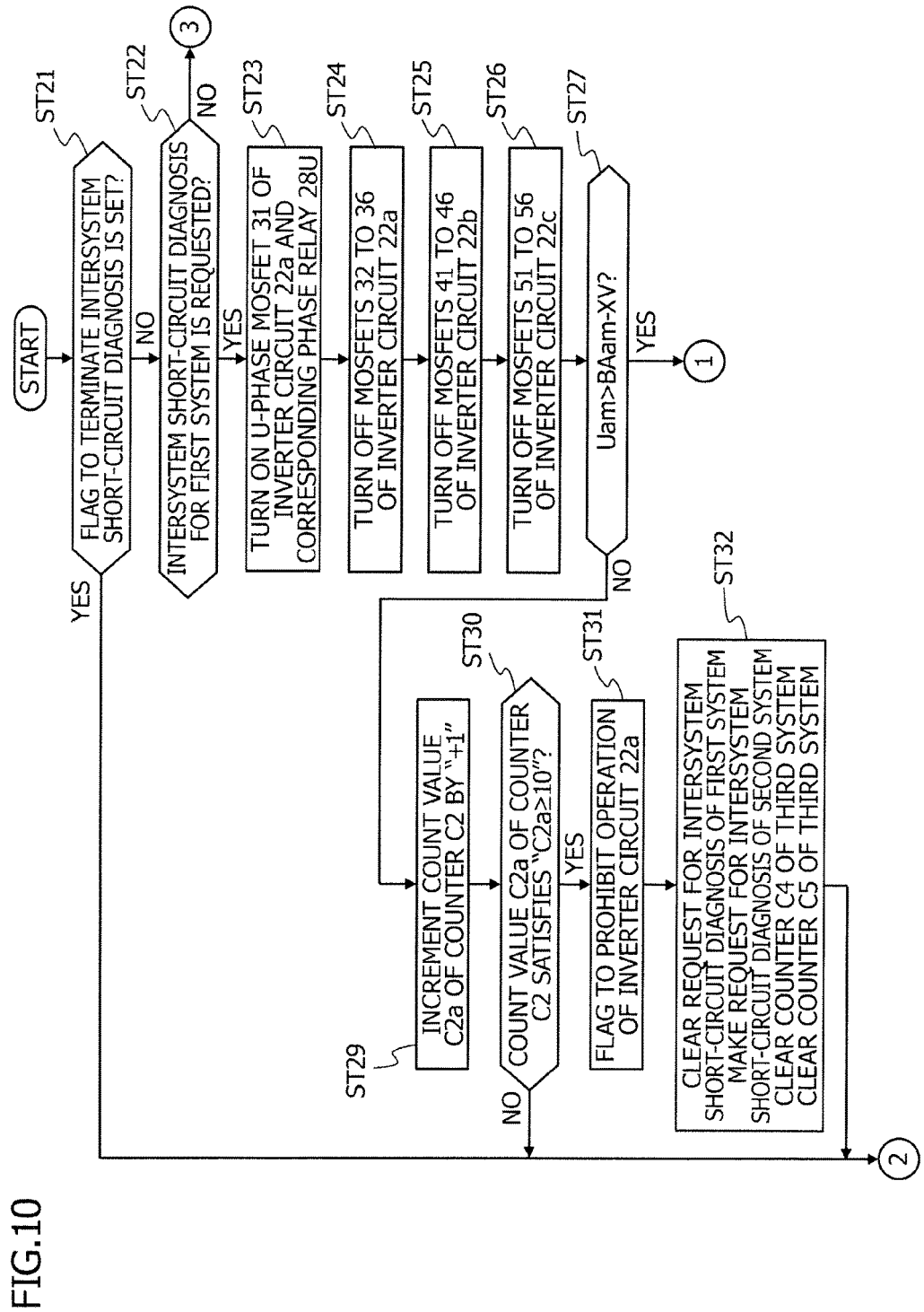
FIG. 10 is a flowchart partially illustrating a control method for the electronic control unit according to the second embodiment of the present invention.
Figure 11:
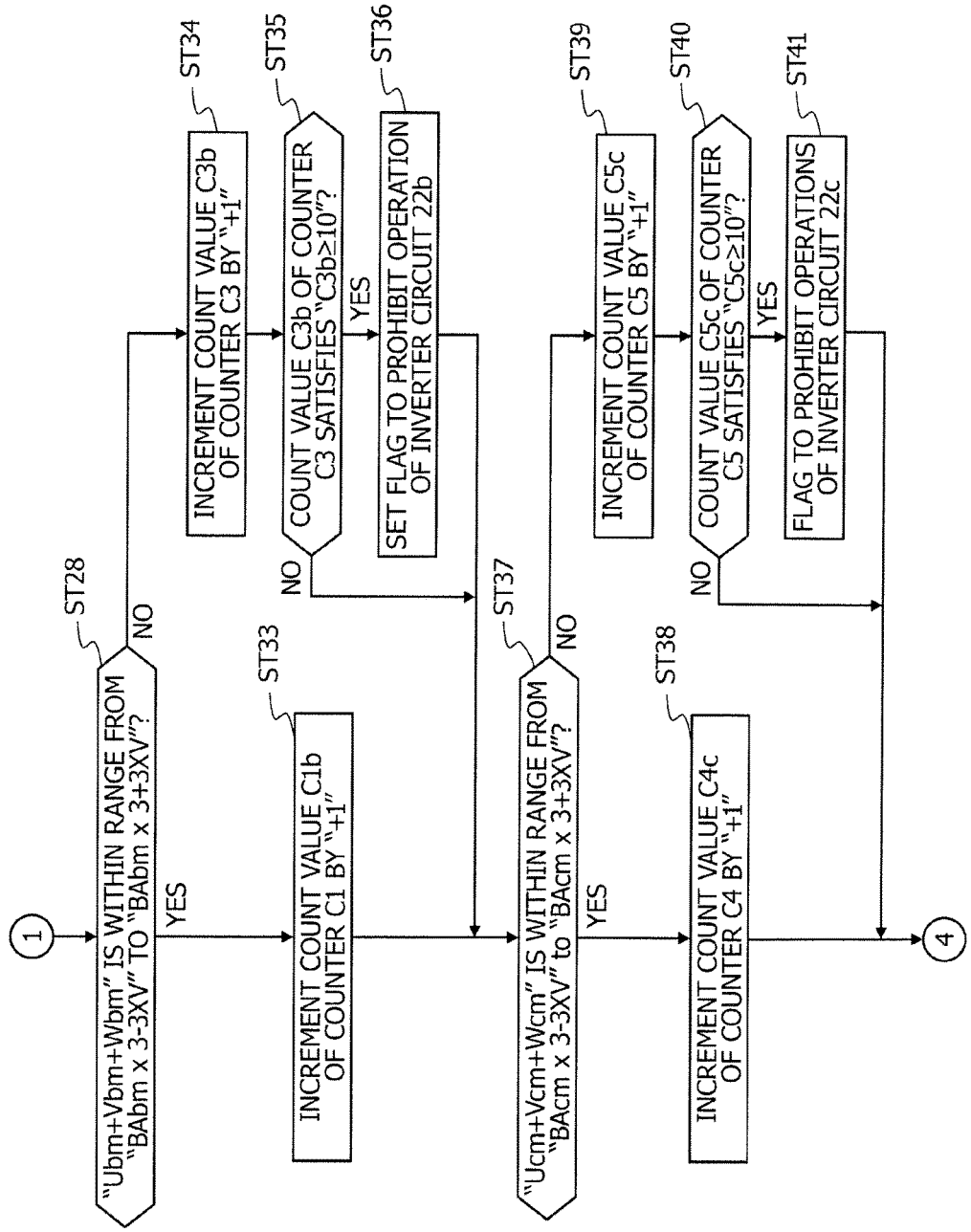
FIG. 11 is a flowchart partially illustrating a control method for the electronic control unit according to the second embodiment of the present invention.
Figure 12:
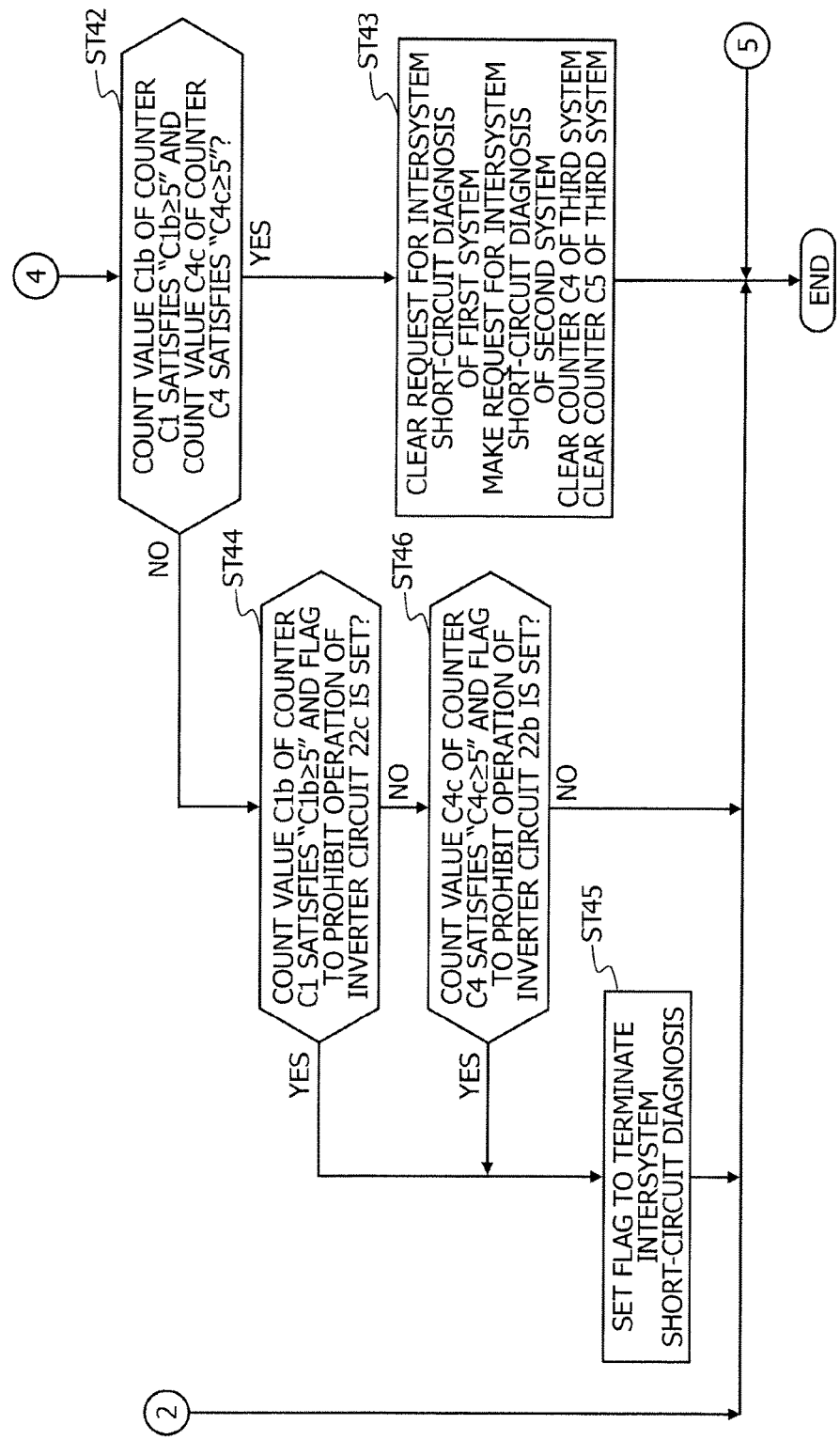
FIG. 12 is a flowchart partially illustrating a control method for the electronic control unit according to the second embodiment of the present invention.
Figure 13:
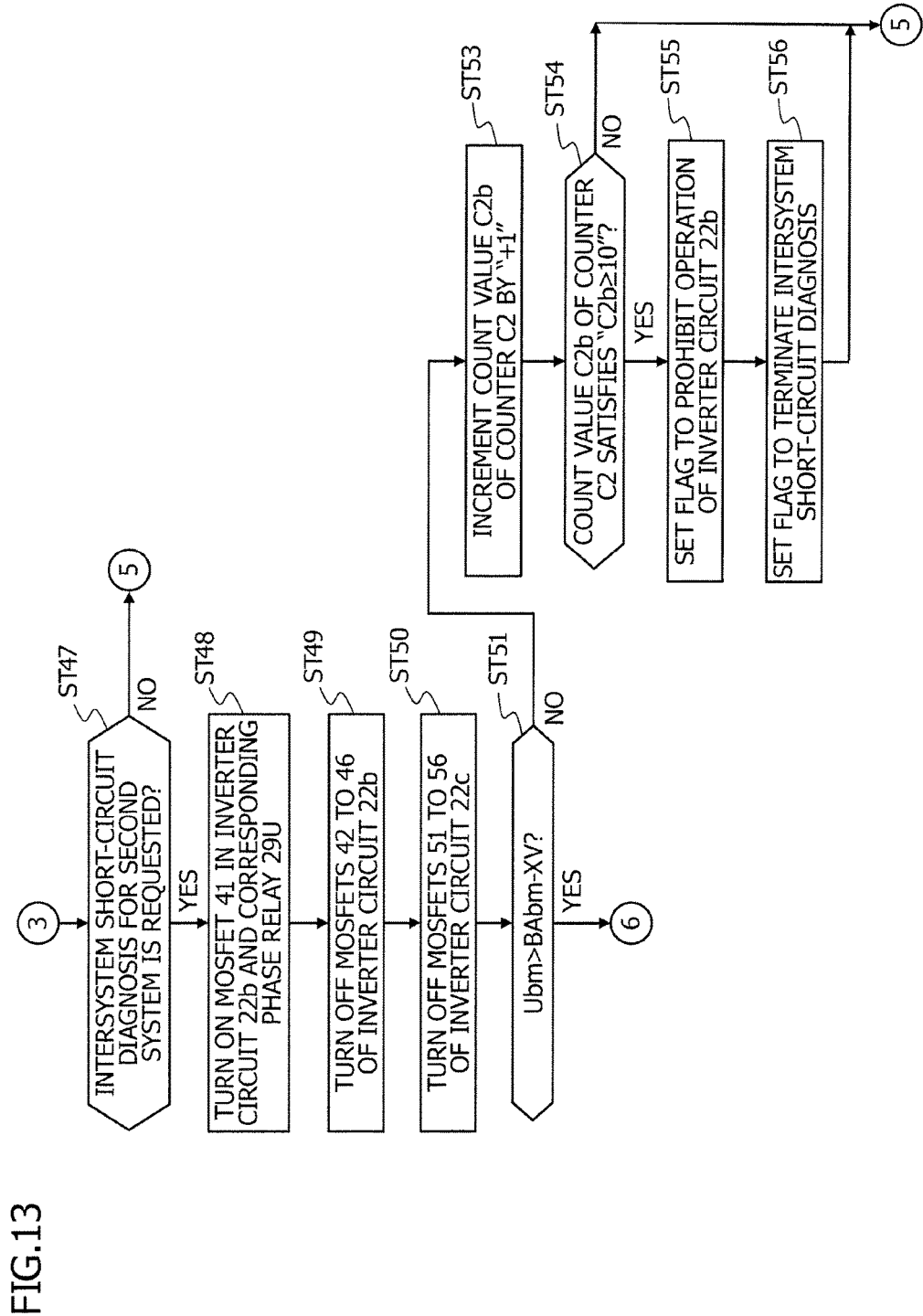
FIG. 13 is a flowchart partially illustrating a control method for the electronic control unit according to the second embodiment of the present invention.
Figure 14:
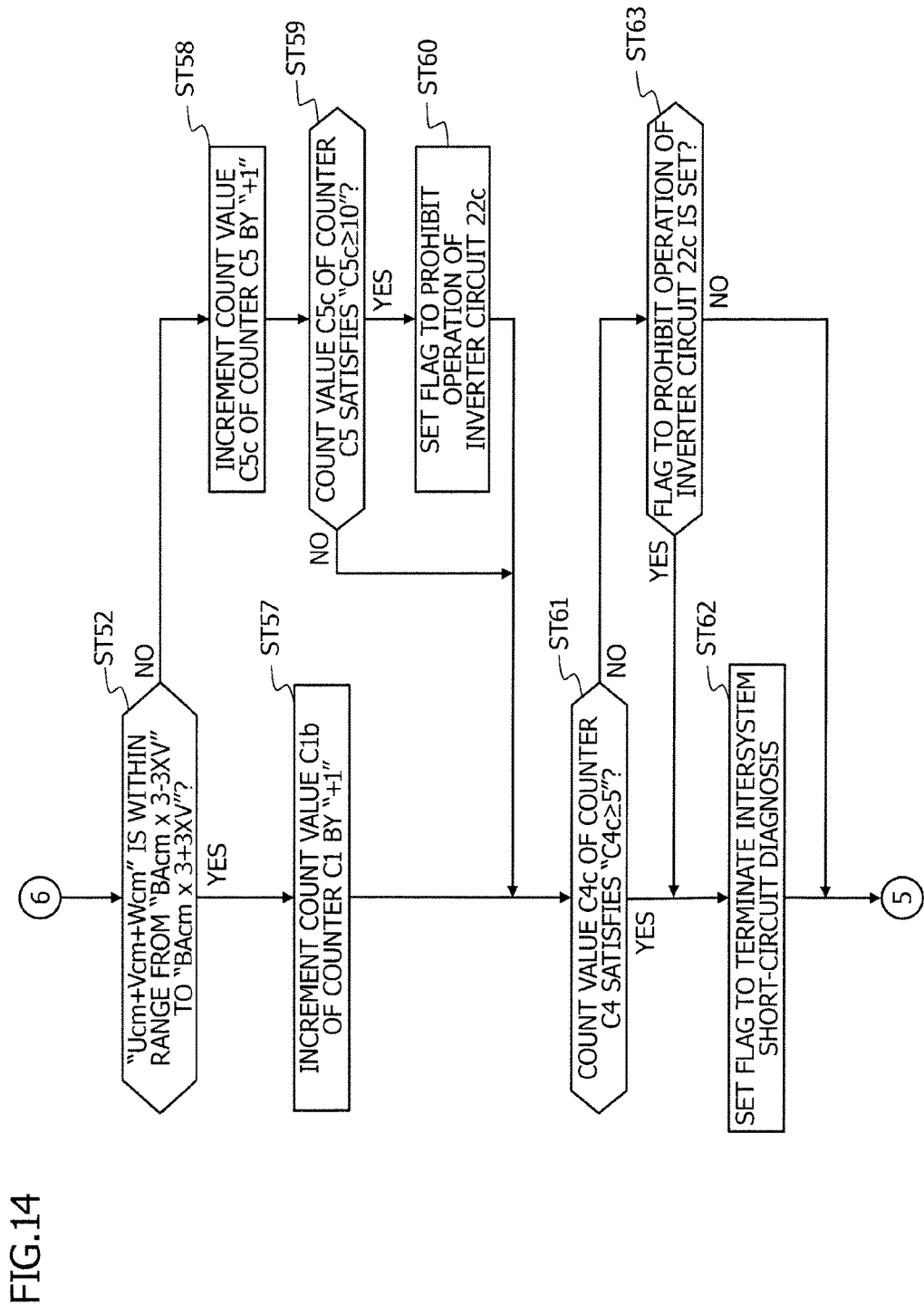
FIG. 14 is a flowchart partially illustrating a control method for the electronic control unit according to the second embodiment of the present invention.

Next, the diagnosis operation is described in detail. First, as illustrated in FIG. 10, it is determined whether a flag to terminate the intersystem short-circuit diagnosis is set (step ST21). If the flag is set, the operation is terminated. Otherwise, the diagnosis is started.

In step ST22, it is determined whether an intersystem short-circuit diagnosis for the first system is requested. If requested, the U-phase upper arm switching element of inverter circuit 22a in the first system is controlled to be ON and also, phase relay 28U is controlled to be ON (current supplied). More specifically, driver 23a drives U-phase MOSFET 31 of inverter circuit 22a to be ON under the control of microcomputer 20. Also, a MOSET that functions as U-phase phase relay 28U is controlled to be ON (step ST23).

In step ST24, MOSFETs 32 to 36 as the U-phase lower arm switching element, the V-phase upper arm switching element, the V-phase lower arm switching element, the W-phase upper arm switching element, and the W-phase lower arm switching element of inverter circuit 22a in the first system are controlled to be OFF. As a result, inverter circuit 22a has a high-level output in the U phase and a high-impedance output in the V and W phases.

In step ST25, MOSFETs 41 to 46 as the U-phase upper arm switching element, the U-phase lower arm switching element, the V-phase upper arm switching element, the V-phase lower arm switching element, the W-phase upper arm switching element, and the W-phase lower arm switching element of inverter circuit 22b in the second system are controlled to be OFF. As a result, inverter circuit 22b has a high-impedance output in all phases.

In step ST26, MOSFETs 51 to 56 as the U-phase upper arm switching element, the U-phase lower arm switching element, the V-phase upper arm switching element, the V-phase lower arm switching element, the W-phase upper arm switching element, and the W-phase lower arm switching element of inverter circuit 22c in the third system are controlled to be OFF. As a result, inverter circuit 22c also has a high-impedance output in all phases.

In subsequent step ST27, microcomputer 20 determines whether monitored value Uam of a U-phase potential of inverter circuit 22a in the first system, detected by phase potential detecting circuit 4a, is larger than monitored value BAam of a power supply voltage in inverter circuit 22a, detected by power supply voltage monitor circuit 5a. In this example, whether "Uam>BAam-XV" is determined with an allowance of predetermined voltage XV (about 1 volt).

If "Uam>BAam-XV", no failure has occurred. Then, it is determined whether the total sum "Ubm+Vbm+Wbm" of monitored value Ubm of U-phase potential, monitored value Vbm of the V-phase potential, and monitored value Wbm of the W-phase potential of inverter circuit 22b in the second system is within the range from "BAbm (monitored value of the power supply voltage of inverter circuit 22b)×3−3XV" to "BAbm (monitored value of the power supply voltage of inverter circuit 22b)×3+3XV" (step ST28 of FIG. 11). Here, "−3XV" and "+3XV" indicate that an allowance of predetermined voltage XV is added to monitored value BAbm.

On the other hand, if it is determined in step ST27 that "Uam>BAam-XV" is not satisfied, that is, a failure has occurred, count value C2a of counter C2 indicating that a failure occurs upon applying a high-level potential to the U phase of the first system is incremented by "+1" (step ST29).

Subsequently, it is determined whether count value C2a of counter C2 satisfies "C2a≥10" (step ST30). If "C2a≥10", it is determined that the first system has failed (failure confirmed) and the flag to prohibit operation of inverter circuit 22a is set (step ST31). After that, the request for the intersystem short-circuit diagnosis of the first system is cleared and a request for an intersystem short-circuit diagnosis of the second system is made. Also, a counter C4 indicating that no intersystem short-circuit has occurred in the third system is cleared and also, a counter C5 indicating that an intersystem short-circuit has occurred in the third system is cleared to terminate the diagnosis (step ST32).

If it is determined that "C2a≥10" is not satisfied in step ST30, the diagnosis is ended, followed by waiting for the next failure diagnosis operation to start after a predetermined time.

Next, if it is determined that the value is within a target range (normal) in step ST28, count value C1b of counter C1 indicating that no intersystem short-circuit has occurred in the second system is incremented by "+1" (step ST33).

If it is determined that the value is not within a target range (failed) in step ST28, count value C3b of counter C3 indicating that an intersystem short-circuit has occurred in the second system is incremented by "+1" (step ST34).

Subsequently, it is determined whether count value C3b of counter C3 satisfies "C3b≥10" (step ST35). If "C3b≥10", it is determined that the second system has failed (failure confirmed), the flag to prohibit operation of inverter circuit 22b is set (step ST36). Then, the operation proceeds to step ST37 to diagnose the third system. If it is determined that "C3b≥10" is not satisfied in step ST35, the operation proceeds to step ST37 to diagnose the third system.

In step ST37, it is determined whether the total sum "Ucm+Vcm+Wcm" of monitored value Ucm of U-phase potential, monitored value Vcm of V-phase potential, and monitored value Wcm of W-phase potential of inverter circuit 22c in the third system is within a range from "BAcm (monitored value of the power supply voltage in inverter circuit 22c)×3−3XV" to "BAcm (monitored value of the power supply voltage in inverter circuit 22c)×3+3XV". Here, "−3XV" and "+3XV" indicate that an allowance of predetermined voltage XV is added to monitored value BAbm.

If it is determined that the value is within a target range (normal) in step ST37, count value C4c of counter C4 indicating that no intersystem short-circuit has occurred in the third system is incremented by "+1" (step ST38).

If it is determined that the value is not within a target range (failed) in step ST37, a count value C5c of a counter C5 indicating that an intersystem short-circuit has occurred in the third system is incremented by "+1" (step ST39).

Subsequently, it is determined whether count value C5c of counter C5 satisfies "C5c≥10" (step ST40). If "C5c≥10", it is determined that the third system has failed (failure confirmed), and the flag to prohibit operation of inverter circuit 22c is set (step ST41). Then, the operation proceeds to step ST42 in FIG. 12 to determine whether a short-circuit failure has occurred between the first and second systems and between the second and third systems. Also, if it is determined that "C5c≥10" is not satisfied in step ST40, the operation also proceeds to step ST42 to determine whether a short-circuit failure has occurred.

In step ST42, it is determined whether count value C1b of counter C1 indicating that no intersystem short-circuit has occurred in the second system satisfies "C1b≥5", and whether count value C4c of counter C4 indicating that no intersystem short-circuit has occurred in the third system satisfies "C4c≥5". If count values C1b and C4c of both counters C1 and C4 satisfy the above conditions, it means that no short-circuit failure has occurred between the first and second systems and between the second and third systems. Thus, the request for the intersystem short-circuit diagnosis of the first system is cleared, and a request for an intersystem short-circuit diagnosis of the second system is made. Also, counter C4 indicating that no intersystem short-circuit has occurred in the third system is cleared and also, counter C5 indicating that an intersystem short-circuit has occurred in the third system is cleared to terminate the diagnosis (step ST43).

On the other hand, if it is determined that the conditions are not satisfied in step ST42, the operation proceeds to step ST44 to determine whether count value C1b of counter C1 indicating that no intersystem short-circuit has occurred in the second system satisfies "C1b≥5", and whether the flag to prohibit operation of inverter circuit 22c of the third system is set. If it is determined that both the conditions are satisfied, the first and second systems are not short-circuited and the first and third systems are short-circuited. In subsequent step ST45, the flag to terminate the intersystem short-circuit diagnosis is set to terminate the diagnosis. Then, three-phase motor 12 is driven by the drive circuits of the first and second systems so as to assist the steering force.

If it is determined that both the conditions are not satisfied in step ST44, it is determined whether count value C4c of counter C4 indicating that no intersystem short-circuit has occurred in the third system satisfies "C4c≥5", and whether the flag to prohibit operation of inverter circuit 22b of the second system is set (step ST46). If it is determined that both the conditions are satisfied, the first and second systems are short-circuited, and the first and third systems are not short-circuited. In subsequent step ST45, the flag to terminate the intersystem short-circuit diagnosis is set to terminate the diagnosis. Then, three-phase motor 12 is driven by the drive circuit of the first and third systems so as to assist the steering force.

On the other hand, if it is determined that both the conditions are not satisfied in step ST46, the first and second systems are short-circuited, and the first and third systems are also short-circuited. In such a case of double failure, assist operations are prohibited to maintain the failure diagnosis loop.

It is determined whether an intersystem short-circuit diagnosis for the first system is requested in step ST22 above. If not requested, it is determined whether an intersystem short-circuit diagnosis for the second system is requested (step ST47 of FIG. 13). If requested, the U-phase upper arm switching element of inverter circuit 22b in the second system is controlled to be ON, while a current is supplied to phase relay 29U. More specifically, driver 23b drives U-phase MOSFET 41 in inverter circuit 22b to be ON under the control of microcomputer 20 and also, drives the MOSFET as phase relay 29U to be ON (step ST48). If the intersystem short-circuit diagnosis for the second system is not requested, the diagnosis is terminated.

In step ST49, MOSFETs 42 to 46 as the U-phase lower arm switching element, the V-phase upper arm switching element, the V-phase lower arm switching element, the W-phase upper arm switching element, and the W-phase lower arm switching element in inverter circuit 22b of the second system are controlled to be OFF. As a result, inverter circuit 22b has a high-level output in the U phase, and a high-impedance output in the V and W phases.

In step ST50, MOSFETs 51 to 56 as the U-phase upper arm switching element, the U-phase lower arm switching element, the V-phase upper arm switching element, the V-phase lower arm switching element, the W-phase upper arm switching element, and the W-phase lower arm switching element of inverter circuit 22c in the third system are controlled to be OFF. As a result, inverter circuit 22c has a high-impedance output in all phases.

In subsequent step ST51, microcomputer 20 determines whether monitored value Ubm of the U-phase potential of inverter circuit 22b in the second system, detected by phase potential detecting circuit 4b, is larger than monitored value BAbm of the power supply voltage in inverter circuit 22b, detected by power supply voltage monitor circuit 5b. In this example, it is determined whether "Ubm>BAbm-XV" with an allowance of predetermined voltage XV (about 1 volt).

Then, if "Ubm>BAbm-XV", it means that no failure has occurred. Then, it is determined whether total sum "Ucm+Vcm+Wcm" of the monitored value Ucm of U-phase potential, monitored value Vcm of V-phase potential, and monitored value Wcm of W-phase potential, of inverter circuit 22c in the third system, is within a range from "BAcm (monitored value of the power supply voltage in inverter circuit 22c)×3−3XV" to "BAcm (monitored value of the power supply voltage in inverter circuit 22c)×3+3XV" (step ST52 of FIG. 14). Here, "−3XV" and "+3XV" indicate that an allowance of predetermined voltage XV is added to monitored value BAbm.

On the other hand, if it is determined in step ST51 that "Ubm>BAbm-XV" is not satisfied, that is, a failure has occurred, a count value C2b of a counter C2 indicating that a failure occurs upon applying a high-level potential to the U phase of the second system is incremented by "+1" (step ST53).

Subsequently, it is determined whether count value C2b of counter C2 satisfies "C2b≥10" (step ST54). If "C2b≥10", it is determined that the second system has failed (failure confirmed), the flag to prohibit operation of inverter circuit 22b is set (step ST55). Then, the flag to terminate the intersystem short-circuit diagnosis is set to terminate the diagnosis (step ST56).

If it is determined that "C2b≥10" is not satisfied in step ST54, the diagnosis is terminated.

Next, if it is determined that the value is within a target range (normal) in step ST52, count value C4c of counter C4 indicating that no intersystem short-circuit has occurred in the third system is incremented by "+1" (step ST57).

If it is determined that the value is not within a target range (failed) in step ST52, count value C5c of counter C5 indicating that an intersystem short-circuit has occurred in the third system is incremented by "+1" (step ST58).

Next, it is determined whether count value C5c of counter C5 satisfies "C5c≥10" (step ST59). If "C5c≥10", it is determined that the third system has failed (failure confirmed), and the flag to prohibit operation of inverter circuit 22c is set (step ST60). Then, the operation proceeds to step ST61 to diagnose the third system. Also in the case where "C5c≥10" is not satisfied in step ST59, the operation proceeds to step ST61 to diagnose the third system.

It is determined whether count value C4c of counter C4 indicating that no intersystem short-circuit has occurred in the third system satisfies "C4c≥5" in step ST61. If "C4c≥5", no short-circuit failure has occurred between the second and third systems and the flag to terminate the intersystem short-circuit diagnosis is set to terminate the diagnosis (step ST62).

On the other hand, if it is determined that "C4c<5" in step ST61, it is determined whether the flag to prohibit operation of inverter circuit 22c in the third system is set (step ST63). Then, the flag to prohibit operation of inverter circuit 22c is set, the operation proceeds to step ST62, and the flag to terminate the intersystem short-circuit diagnosis is set to terminate the diagnosis. If the flag is not set, the diagnosis is terminated at this point.

When detecting that the flag to terminate the intersystem short-circuit diagnosis is set in steps ST45, ST56, ST62, microcomputer 20 starts normal motor control operation. During the normal operation, a current is supplied to three-phase motor 12 from drive circuits 21a, 21b, 21c of the first to third systems, and the motor is driven with the added current of two systems in total.

In the normal assist state with drive circuits 21a, 21b, 21c of the first to third systems, microcomputer 20 outputs a pulse width modulation signal (PWM signal), for example, to drivers 23a, 23b, 23c. Also, signals for turning ON power supply relays 25a, 25b, 25c are output to drivers 26a, 26b, 26c. Each H-side driver and each L-side driver in drivers 23a, 23b, 23c supply drive signals based on PWM signals to gates of MOSFETs 31 to 36, MOSFETs 41 to 46, and MOSFETs 51 to 56 of inverter circuits 22a, 22b, 22c of the first to third systems based on the PWM signals so as to selectively control the gates to be ON/OFF.

Then, three-phase motor 12 is driven in three phases by drive circuit 21a via drive lines 1U, 1V, 1W and driven in three phases by drive circuit 21b via drive lines 2U, 2V, 2W and also driven in three phases by drive circuit 21c via drive lines 3U, 3V, 3W. At this time, the duty ratio of the PWM signal is varied based on steering torque signal S1, vehicle speed signal S2, and the like to control an output torque of three-phase motor 12, thereby changing an assist force.

Furthermore, microcomputer 20 executes a motor control operation by use of a normal system (not short-circuited) according to a short-circuited state of a failed system. At this time, an output of the inverter circuit of the failed system is held at a high impedance so as not to affect driving of the other system. Thus, although the steering assist force is lowered, the assist operation can be continued, making is possible to prevent decline in safety caused by sudden stop of the assist operation.

Note that in the control method illustrated in FIGS. 10 to 14, MOSFET 31 of inverter circuit 22a in the first system is controlled to be ON and also, phase relay 28U is controlled to be ON. Under such conditions, a potential of drive line 1U is increased so that a short-circuit failure can be detected based on whether the potential affects inverter circuits 22b, 22c of the second and third systems. Alternatively, it is also possible to control MOSFET 32 of inverter circuit 22a of the first system to be ON and control phase relay 28U to be OFF, and under such conditions, reduce a potential of drive line 1U so that a short-circuit failure can be detected based on whether the potential affects inverter circuits 22b, 22c of the second and third systems, as in the first embodiment. If not short-circuited, drive lines 2U, 2V, 2W of the second system and drive lines 3U, 3V, 3W of the third system have an intermediate potential. Otherwise, their potential level becomes low due to a decrease in phase potential of drive line 1U of the first system. Based on this, the presence/absence of a short-circuit failure can be determined.

As described above, in the control method for an electronic control unit according to the second embodiment of the present invention, an output of the inverter circuit of one system is controlled to be a high impedance and under such conditions, the presence/absence of a short-circuit failure is determined based on whether a phase potential on the inverter circuit side of the remaining two systems is transmitted. Furthermore, whether a short-circuit failure has occurred in the inverter circuits of the second and third systems is determined through the same operations. Accordingly, a current path through which a current is supplied from the power supply to the ground point is not formed and no large current flows. Thus, a short-circuit failure can be detected without abnormal current supply to any coil or drive circuit of the three-phase motor.

Note that the present invention is not limited to the above first and second embodiments and can be modified in various ways without departing from the gist of the invention.

Modified Example 1

For example, in the first and second embodiments, an example of driving a multiphase motor by the inverter circuits of the two systems or the three systems is described. It is, needless to say, possible to apply the present invention to an electronic control unit driven by inverter circuit of n systems (n≥4) as well.

Modified Example 2

In the above example, the electronic control unit is applied to the EPS system. However, it can be applied to any other types of devices or systems in which a multiphase motor is driven by inverter circuits of two systems (or plural systems) such as a steer-by-wire device as well as the EPS system.

Modified Example 3

Moreover, in the above example, the inverter circuits of the two systems are controlled by one microcomputer. However, it is also possible to control each inverter circuit by a dedicated microcomputer. Alternatively, one microcomputer may control inverter circuits of the three or more systems.

Modified Example 4

In the above example, the phase potential detecting circuit (phase potential monitor) and the potential applying circuit (pull up resistor) are provided between the phase relay and the coils of the three-phase motor but can be provided between the inverter circuit and the phase relay. In other words, the phase voltage monitor and the pull up resistor can be provided either of upstream and downstream of the phase relay as long as it is disposed between the inverter circuit and the coils of the motor.

Modified Example 5

The above description is given of the electronic control unit having a phase relay between each inverter circuit and the coils of the motor by way of example. However, the present invention is also applicable to an electronic control unit having no phase relay. Also, in the above example, the semiconductor element for the phase relay is provided in each phase by way of example. However, the present invention is also applicable to an electronic control unit with such phase relay configuration that two semiconductor elements of which parasitic diodes are oppositely formed are provided.

Modified Example 6

Also, the above description is given of an example of controlling both of the upper arm switching element and the lower arm switching element to be OFF in order to obtain a high-impedance output of the inverter circuit. However, in the case where a potential on the coil set side is detected by the phase potential detecting circuit and one end of the pull up resistor is connected to any coil, it is also possible to execute a diagnosis in such a manner that the phase relay is controlled to be OFF to thereby obtain a high-impedance output of the inverter circuit.

Modified Example 7

Moreover, in the case where the phase potential detecting circuit is configured by a group of series-connected resistor elements, the phase potential is decreased to a low level. Thus, in the case of controlling the upper arm switching element to be ON and the lower arm switching element to be OFF, that is, high level, a short-circuit failure of the coil can be detected without the pull up resistor for setting the phase potential to an intermediate potential.

Modified Example 8

In the above example, the phase potential detecting circuit is configured by the group of series-connected resistor elements. However, it is, needless to say, to adopt any other types of configuration as long as a phase potential can be detected.

Modified Example 9

Also, in the above example, the Metal Oxide Semiconductor Field Effect Transistor (MOSFET) is used as the switching element in each inverter circuit. The present invention is similarly applicable to other semiconductor elements such as Insulated Gate Bipolar Transistor (IGBT) as well.

REFERENCE SYMBOL LIST 1U, 1V, 1W, 2U, 2V, 2W, 3U, 3V, 3W drive line (current supply path)
4a, 4b, 4c phase potential detecting circuit
5a, 5b, 5c power supply voltage monitor circuit
6a, 6b pull up resistor (potential applying circuit)
12 three-phase motor (multiphase motor)
12a, 12b, 12c coil set
13 electronic control unit
20 microcomputer (diagnosis apparatus)
21a, 21b, 21c drive circuit
22a, 22b, 22c inverter circuit
23a, 23b, 23c driver
25a, 25b, 25c power supply relay
28U, 28V, 28W, 29U, 29V, 29W, 30U, 30V, 30W phase relay (current supply cutoff element)
31 to 36, 41 to 46, 51 to 56 MOSFET

The invention claimed is:
1. An electronic control unit comprising:
an inverter circuit of a first system and an inverter circuit of a second system, each of which includes an upper arm switching element and a lower arm switching element for each coil of a multiphase motor having first and second coil sets;
a first phase potential detecting circuit configured to detect a potential of at least one phase of a current supply path from the inverter circuit of the first system to the first coil set;
a second phase potential detecting circuit configured to detect a potential of at least one phase of a current supply path from the inverter circuit of the second system to the second coil set; and
a diagnosis apparatus configured to detect a failure based on potentials in each phase detected by the first and second phase potential detecting circuits, in which under condition that one of the upper arm switching element and the lower arm switching element corresponding to one phase of the first coil set is controlled to be ON and the other is controlled to be OFF by use of the inverter circuit of the first system so that the inverter circuit of the second system has a high-impedance output in all phases, when the potential of the current supply path detected by the second phase potential detecting circuit corresponds to an output potential of the inverter circuit of the first system, the diagnosis apparatus determines that a short-circuit failure has occurred.

2. The electronic control unit according to claim 1, wherein
the diagnosis apparatus determines that a short-circuit failure has occurred when the potential detected by the first phase potential detecting circuit and the potential detected by the second phase potential detecting circuit both correspond to an output potential of the inverter circuit of the first system.

3. The electronic control unit according to claim 1, wherein
when the diagnosis apparatus determines that a short-circuit failure has occurred, an output of one of the inverter circuit of the first system and the inverter circuit of the second system is held at a high impedance.

4. The electronic control unit according to claim 1, wherein
when the diagnosis apparatus determines that a short-circuit failure has occurred, an output of the inverter circuit of the second system is held at a high impedance.

5. The electronic control unit according to claim 1, wherein
when a high-impedance output of the inverter circuit causes both of the upper arm switching element and the lower arm switching element to be OFF.

6. The electronic control unit according to claim 1, wherein
when the upper arm switching element corresponding to one phase of the inverter circuit of the first system is in an ON state and the lower arm switching element thereof is in an OFF state, the diagnosis apparatus determines that a failure has occurred in a phase of a coil, of which a potential of the current supply path is not lower than a predetermined potential, in the inverter circuit of the second system.

7. The electronic control unit according to claim 1, wherein
when the upper arm switching element corresponding to one phase of the inverter circuit of the first system is in an OFF state, and the lower arm switching element thereof is in an ON state, the diagnosis apparatus determines that a failure has occurred in a phase of a coil, of which a potential of the current supply path is not higher than a predetermined potential, in the inverter circuit of the second system.

8. The electronic control unit according to claim 1, further comprising
first and second potential applying circuits configured to apply a predetermined potential to each current supply path for connecting the first and second coil sets of the multiphase motor and the inverter circuits of the first and second systems.

9. The electronic control unit according to claim 8, wherein
the predetermined potential applied by the first and second potential applying circuits is an intermediate potential between a power supply potential and a ground potential.

10. The electronic control unit according to claim 1, further comprising
a current supply cutoff element with a parasitic diode which is provided in a current supply path in each phase configured to supply current from the inverter circuits of the first and second systems to the first and second coil sets of the multiphase motor.

11. The electronic control unit according to claim 10, wherein
the diagnosis apparatus executes diagnosis under condition that the upper arm switching element corresponding to one phase of the inverter circuit of the first system is in an OFF state, the lower arm switching element thereof is in an ON state, and the current supply cutoff element is in an OFF state.

12. The electronic control unit according to claim 10, wherein
the diagnosis apparatus executes diagnosis under condition that the upper arm switching element corresponding to one phase of the inverter circuit of the first system is in an ON state, the lower arm switching element thereof is in an OFF state, and the current supply cutoff element is in an ON state.

13. The electronic control unit according to claim 10, wherein
when the parasitic diode is formed in a forward direction from the first and second coil sets to the inverter circuits of the first and second systems, the diagnosis apparatus executes diagnosis under condition that upper arm switching elements in all phases are in an ON state, and lower arm switching elements in all phases and the current supply cutoff element are in an OFF state.

14. The electronic control unit according to claim 10, wherein
when the parasitic diode is formed in a forward direction from the inverter circuits of the first and second systems to the first and second coil sets, the diagnosis apparatus executes diagnosis under condition that upper arm switching elements in all phases are in an OFF state, and lower arm switching elements in all phases and the current supply cutoff element are in an ON state.

15. The electronic control unit according to claim 1, further comprising:
a first current detecting circuit configured to detect a current value of current flowing through the lower arm switching element or the upper arm switching element of the inverter circuit of the first system; and
a second current detecting circuit configured to detect a current value of current flowing through the lower arm switching element or the upper arm switching element of the inverter circuit of the second system.

16. The electronic control unit according to claim 1, further comprising first and second power supply voltage monitor circuits configured to monitor power supply voltages applied to the first and second inverter circuits, respectively.

17. The electronic control unit according to claim 1, wherein
the multiphase motor is used for an electric power steering system or a steer-by-wire device, and the diagnosis apparatus comprises a microcomputer or a CPU which is configured to control the inverter circuits of the first and second systems.

18. An electronic control unit comprising:
an inverter circuit of a first system and an inverter circuit of a second system, each of which includes an upper arm switching element and a lower arm switching element for each coil of a multiphase motor having first and second coil sets;
a first potential detecting circuit configured to detect a potential of a coil of at least one phase, which is applied from the inverter circuit of the first system to the first coil set;
a second potential detecting circuit configured to detect a potential of a coil of at least one phase, which is applied from the inverter circuit of the second system to the second coil set; and
a diagnosis apparatus configured to detect a failure based on potentials of each coil detected by the first and second potential detecting circuits, in which under condition that one of the upper arm switching element and the lower arm switching element corresponding to one phase of the first coil set is controlled to be ON and the other is controlled to be OFF by use of the inverter circuit of the first system so that the inverter circuit of the second system has a high-impedance output in all phases, when the potential of the coil detected by the second potential detecting circuit corresponds to an output potential of the inverter circuit of the first system, the diagnosis apparatus determines that a failure has occurred.

19. A control method for an electronic control unit that includes:
an inverter circuit of a first system and an inverter circuit of a second system, each of which includes an upper arm switching element and a lower arm switching element for each coil of a multiphase motor having first and second coil sets;
a first phase potential detecting circuit configured to detect a potential of at least one phase of a current supply path from the inverter circuit of the first system to the first coil set;
a second phase potential detecting circuit configured to detect a potential of at least one phase of a current supply path from the inverter circuit of the second system to the second coil set; and
a diagnosis apparatus configured to detect a failure based on potentials in each phase detected by the first and second phase potential detecting circuits,
the control method comprising the steps of:
controlling one of the upper arm switching element and the lower arm switching element corresponding to one phase of the first coil set to be ON and the other to be OFF by use of the inverter circuit of the first system, and controlling outputs in all phases of the inverter circuit of the second system to be a high impedance;
detecting a potential of at least one phase by use of the second phase potential detecting circuit; and
determining that a short-circuit failure has occurred when the potential of the current supply path detected by the second phase potential detecting circuit corresponds to an output potential of the inverter circuit of the first system by use of the diagnosis apparatus.

20. The control method for an electronic control unit according to claim 19, further comprising a step of holding an output of one of the inverter circuit of the first system and the inverter circuit of the second system at a high impedance and then driving the multiphase motor using an output of the other inverter circuit, after the step of determining that a short-circuit failure has occurred.

* * * * *